US009845141B2

(12) United States Patent
Sehnert et al.

(10) Patent No.: US 9,845,141 B2
(45) Date of Patent: Dec. 19, 2017

(54) ATMOSPHERIC BALLOON SYSTEM

(71) Applicant: Raven Industries, Inc., Sioux Falls, SD (US)

(72) Inventors: Kurt L. Sehnert, Sulphur Springs, TX (US); Edward Lee Rainwater, Quitman, TX (US); Michael S. Smith, Sulphur Springs, TX (US); Randy E. Scott, Sulphur Springs, TX (US); Justin Lee Marsh, Renner, SD (US); Mark L. West, Sioux Falls, SD (US)

(73) Assignee: Raven Industries, Inc., Sioux Falls, SD (US)

(*) Notice: Subject to any disclaimer, the term of this patent is extended or adjusted under 35 U.S.C. 154(b) by 0 days.

(21) Appl. No.: 15/061,777

(22) Filed: Mar. 4, 2016

(65) Prior Publication Data
US 2016/0288894 A1 Oct. 6, 2016

Related U.S. Application Data

(63) Continuation-in-part of application No. 14/804,038, filed on Jul. 20, 2015, now Pat. No. 9,463,861, which
(Continued)

(51) Int. Cl.
*B64B 1/02* (2006.01)
*B64B 1/40* (2006.01)
(Continued)

(52) U.S. Cl.
CPC ............... *B64B 1/40* (2013.01); *B64B 1/30* (2013.01); *B64B 1/42* (2013.01); *B64B 1/44* (2013.01);
(Continued)

(58) Field of Classification Search
CPC .... B64B 1/30; B64B 1/42; B64B 1/44; B64B 1/58; B64B 1/70; B64B 45/02;
(Continued)

(56) References Cited

U.S. PATENT DOCUMENTS 1,648,630 A * 11/1927 Upson ...................... B64B 1/00
244/125
1,682,405 A * 8/1928 Naatz ....................... B64B 1/00
244/30
(Continued)

FOREIGN PATENT DOCUMENTS

FR 1347773 A 1/1964
JP 3903202 B2 4/2007
(Continued)

OTHER PUBLICATIONS

"U.S. Appl. No. 13/827,779, Examiner Interview Summary dated Apr. 27, 2015", 3 pgs.
(Continued)

*Primary Examiner* — Medhat Badawi
(74) *Attorney, Agent, or Firm* — Schwegman Lundberg & Woessner, P.A.

(57) ABSTRACT

A balloon system includes a balloon having a balloon membrane extending between an upper apex and a lower apex opening. The lower apex opening extends through the balloon membrane at a balloon lip. A ballonet is within the balloon. The ballonet is coupled with the balloon membrane at the lower apex opening. The ballonet includes a lower ballonet panel having a lower perimeter edge and a ballonet orifice extending through the lower ballonet panel at a ballonet lip and an upper ballonet panel having an upper perimeter edge. The upper and lower ballonet panels are coupled along the respective upper and lower perimeter
(Continued)

edges. A lower apex fitting couples the ballonet with the balloon at the balloon lip of the lower apex opening.

26 Claims, 11 Drawing Sheets

Related U.S. Application Data is a continuation of application No. 13/827,779, filed on Mar. 14, 2013, now Pat. No. 9,193,480.

(60) Provisional application No. 61/734,820, filed on Dec. 7, 2012, provisional application No. 62/128,309, filed on Mar. 4, 2015.

(51) Int. Cl.

| | | |
|---|---|---|
| *B64B 1/64* | (2006.01) | |
| *B64B 1/70* | (2006.01) | |
| *B64B 1/30* | (2006.01) | |
| *B64B 1/42* | (2006.01) | |
| *B64B 1/44* | (2006.01) | |
| *B64D 45/02* | (2006.01) | |
| *B64B 1/62* | (2006.01) | |

(52) U.S. Cl.
CPC .................. *B64B 1/62* (2013.01); *B64B 1/64* (2013.01); *B64B 1/70* (2013.01); *B64D 45/02* (2013.01); *Y10T 156/10* (2015.01)

(58) Field of Classification Search
CPC ........ B64B 1/00; B29C 65/00; B29C 66/1122; B29C 65/02; B29C 66/1142; B29C 66/43; Y10T 156/10; Y02T 50/44
See application file for complete search history.

(56) References Cited

U.S. PATENT DOCUMENTS

| | | | | |
|---|---|---|---|---|
| 1,763,835 A | * | 6/1930 | Upson | B64B 1/00 244/126 |
| 1,944,467 A | | 1/1934 | Sabin | |
| 2,020,526 A | * | 11/1935 | Stahl | B64B 1/60 15/DIG. 11 |
| 2,106,904 A | | 2/1938 | Wilhelm | |
| 2,131,155 A | * | 9/1938 | Waller | B64B 1/00 244/51 |
| 2,232,640 A | | 2/1941 | Schwartzman | |
| 2,313,997 A | * | 3/1943 | Jackson | B65D 88/02 220/565 |
| 2,365,827 A | | 12/1944 | Liebert | |
| 2,492,800 A | * | 12/1949 | Isom | B64B 1/40 244/31 |
| 2,602,609 A | | 7/1952 | Huch et al. | |
| 2,656,293 A | * | 10/1953 | Huch | B29C 66/435 156/251 |
| 2,666,006 A | | 1/1954 | La Mere et al. | |
| 2,666,600 A | | 1/1954 | Huch et al. | |
| 2,679,224 A | * | 5/1954 | Sturtevant | B63C 7/10 114/54 |
| 2,703,769 A | | 3/1955 | Stinger et al. | |
| 2,756,948 A | | 7/1956 | Winzen | |
| 2,758,804 A | * | 8/1956 | Hakomaki | B64B 1/40 244/31 |
| 2,767,940 A | | 10/1956 | Melton | |
| 2,767,941 A | | 10/1956 | Gegner et al. | |
| 2,919,082 A | * | 12/1959 | Winzen | B64B 1/58 24/462 |
| 2,960,282 A | * | 11/1960 | Winzen | B64B 1/58 244/127 |
| 3,063,656 A | * | 11/1962 | Bohl | B64B 1/58 244/31 |
| 3,107,884 A | | 10/1963 | Simko | |
| 3,109,612 A | * | 11/1963 | Winker | B64B 1/58 244/31 |
| 3,182,932 A | * | 5/1965 | Winker | B64B 1/58 244/31 |
| 3,270,987 A | * | 9/1966 | Winckler | B64B 1/58 244/31 |
| 3,312,427 A | * | 4/1967 | Yost | B64B 1/62 244/31 |
| 3,337,162 A | * | 8/1967 | Bauserman | B64B 1/62 244/31 |
| 3,391,883 A | | 7/1968 | Curtis | |
| 3,586,266 A | | 6/1971 | Bucher | |
| 3,654,017 A | | 4/1972 | Ropiequet et al. | |
| 3,706,433 A | * | 12/1972 | Sonstegaard | B64B 1/60 244/128 |
| 4,077,588 A | | 3/1978 | Hurst | |
| 4,223,797 A | | 9/1980 | Skakunov | |
| 4,434,958 A | | 3/1984 | Rougeron et al. | |
| 4,696,444 A | | 9/1987 | Regipa | |
| 4,877,205 A | * | 10/1989 | Rand | B29C 65/18 156/160 |
| 4,928,908 A | | 5/1990 | Horii | |
| 5,104,059 A | * | 4/1992 | Rand | B64B 1/42 244/126 |
| 5,115,998 A | * | 5/1992 | Olive | B64G 9/00 244/126 |
| 5,332,177 A | | 7/1994 | Boyle, Jr. | |
| 5,338,243 A | * | 8/1994 | Kieves | A63H 27/10 40/214 |
| 5,404,868 A | | 4/1995 | Sankrithi | |
| 5,417,393 A | | 5/1995 | Klestadt | |
| 5,588,811 A | | 12/1996 | Price | |
| 5,595,521 A | * | 1/1997 | Becker | A63H 27/10 383/44 |
| 5,645,248 A | * | 7/1997 | Campbell | B64B 1/00 244/125 |
| 5,697,579 A | | 12/1997 | Hayashi | |
| 5,743,786 A | * | 4/1998 | Lindsey | A63H 27/10 446/221 |
| 5,823,468 A | | 10/1998 | Bothe | |
| 5,884,862 A | | 3/1999 | Aurilio et al. | |
| 5,890,676 A | | 4/1999 | Coleman et al. | |
| 6,116,538 A | | 9/2000 | Hafelfinger | |
| 6,189,829 B1 | | 2/2001 | Brotz | |
| 6,290,172 B1 | * | 9/2001 | Yajima | B64B 1/58 244/31 |
| 6,305,641 B1 | | 10/2001 | Onda | |
| 6,315,242 B1 | | 11/2001 | Eichstedt et al. | |
| 6,325,329 B1 | * | 12/2001 | Meadows | B64B 1/40 244/31 |
| 6,386,480 B1 | | 5/2002 | Perry | |
| 6,425,552 B1 | | 7/2002 | Lee et al. | |
| 6,427,943 B2 | | 8/2002 | Yokomaku et al. | |
| 6,439,508 B1 | | 8/2002 | Taylor | |
| 6,547,189 B1 | * | 4/2003 | Raboin | B64G 1/12 244/158.3 |
| 6,565,037 B1 | | 5/2003 | Tonkovich | |
| 6,648,272 B1 | | 11/2003 | Kothmann | |
| 6,659,838 B1 | | 12/2003 | Anderson | |
| 6,685,136 B2 | | 2/2004 | Yajima et al. | |
| 6,698,686 B2 | | 3/2004 | Ogawa et al. | |
| 6,811,115 B2 | | 11/2004 | Kurose | |
| 7,108,228 B1 | | 9/2006 | Marshall | |
| 7,137,592 B2 | | 11/2006 | Barocela et al. | |
| 7,303,166 B2 | | 12/2007 | Geery | |
| D583,294 S | | 12/2008 | Balaskovic | |
| 7,487,936 B2 | | 2/2009 | Heaven, Jr. | |
| 7,490,794 B2 | * | 2/2009 | Heaven, Jr. | B64B 1/06 244/125 |
| 7,552,893 B2 | | 6/2009 | Colting | |
| 7,568,656 B2 | | 8/2009 | Handley | |
| 7,669,796 B2 | | 3/2010 | Nachbar | |
| 7,857,256 B2 | | 12/2010 | Hatton | |
| 7,997,264 B2 | | 8/2011 | Sankrithi | |
| 8,052,082 B1 | | 11/2011 | Herlik | |
| 8,091,826 B2 | | 1/2012 | Voorhees | |
| 8,177,161 B2 | * | 5/2012 | Morehead | B60V 3/08 244/100 A |

(56) References Cited

U.S. PATENT DOCUMENTS

| | | | |
|---|---|---|---|
| 8,297,550 | B2 | 10/2012 | Balaskovic |
| 8,336,810 | B2 * | 12/2012 | Brutoco ............... B64B 1/06 137/899.2 |
| 8,342,442 | B1 | 1/2013 | Dancila |
| 8,356,770 | B2 | 1/2013 | Parks |
| 8,469,313 | B2 | 6/2013 | Dong |
| 8,505,847 | B2 | 8/2013 | Ciampa et al. |
| 8,596,571 | B2 | 12/2013 | Goelet |
| 8,833,696 | B1 | 9/2014 | Teller et al. |
| 9,027,877 | B1 | 5/2015 | Brookes et al. |
| 9,168,994 | B2 | 10/2015 | Ratner |
| 9,193,480 | B2 | 11/2015 | Smith et al. |
| 9,221,531 | B1 | 12/2015 | Brookes et al. |
| 9,463,861 | B2 | 10/2016 | Smith et al. |
| 2001/0002686 | A1 | 6/2001 | Yokomaku et al. |
| 2002/0003189 | A1 | 1/2002 | Kuenkler |
| 2003/0001044 | A1 | 1/2003 | Munk |
| 2003/0102404 | A1 | 6/2003 | Yabe |
| 2003/0234320 | A1 | 12/2003 | Colting |
| 2004/0002392 | A1 * | 1/2004 | Meadows ............ A63G 31/00 472/49 |
| 2005/0130516 | A1 | 6/2005 | Courtney |
| 2005/0236519 | A1 | 10/2005 | Handley |
| 2005/0263642 | A1 | 12/2005 | Geery |
| 2005/0288114 | A1 * | 12/2005 | Meadows ............ A63G 31/00 472/134 |
| 2006/0065777 | A1 | 3/2006 | Walden |
| 2007/0034740 | A1 * | 2/2007 | Li ........................ B64B 1/04 244/30 |
| 2007/0069077 | A1 | 3/2007 | Colting |
| 2007/0075184 | A1 * | 4/2007 | Marimon ............. B64B 1/02 244/30 |
| 2007/0238381 | A1 | 10/2007 | Brewer et al. |
| 2007/0295859 | A1 | 12/2007 | Colvin |
| 2008/0011900 | A1 | 1/2008 | Quintana |
| 2008/0078883 | A1 | 4/2008 | Jong |
| 2008/0166514 | A1 | 7/2008 | Liggett |
| 2009/0072078 | A1 * | 3/2009 | Choi ..................... B64B 1/06 244/30 |
| 2009/0145999 | A1 | 6/2009 | Porter |
| 2009/0189012 | A1 * | 7/2009 | Liggett ................. B64B 1/14 244/30 |
| 2009/0302150 | A1 | 12/2009 | Konstantinovskiy |
| 2010/0100116 | A1 | 4/2010 | Brister et al. |
| 2010/0212719 | A1 | 8/2010 | Stolum |
| 2010/0243121 | A1 | 9/2010 | Eigenbrode |
| 2010/0252687 | A1 | 10/2010 | Hogan |
| 2010/0288875 | A1 * | 11/2010 | Barnes .................. B64B 1/62 244/96 |
| 2011/0174922 | A1 * | 7/2011 | Berman ................ F41H 11/04 244/1 TD |
| 2012/0018571 | A1 * | 1/2012 | Goelet .................. B64B 1/005 244/30 |
| 2012/0212228 | A1 * | 8/2012 | Cho ..................... G01R 33/0385 324/331 |
| 2013/0032665 | A1 | 2/2013 | Lu et al. |
| 2013/0039787 | A1 | 2/2013 | Lucas |
| 2014/0001308 | A1 * | 1/2014 | Costa Duarte Pardal ................ B64B 1/02 224/29 |
| 2014/0027565 | A1 | 1/2014 | Marvin et al. |
| 2014/0158823 | A1 | 6/2014 | Smith et al. |
| 2014/0163664 | A1 | 6/2014 | Goldsmith |
| 2014/0170344 | A1 | 6/2014 | Pramanik et al. |
| 2015/0360763 | A1 | 12/2015 | Smith et al. |
| 2016/0207605 | A1 * | 7/2016 | Jensen ................... B64B 1/40 |
| 2016/0221661 | A1 * | 8/2016 | Bohannon ............. B64B 1/58 |

FOREIGN PATENT DOCUMENTS

| WO | WO-89/06205 A1 | 7/1989 |
|---|---|---|
| WO | WO-2014/089465 A1 | 6/2014 |

OTHER PUBLICATIONS

"U.S. Appl. No. 13/827,779, Non Final Office Action dated Dec. 23, 2014", 30 pgs.

"U.S. Appl. No. 13/827,779, Notice of Allowance dated May 11, 2015", 5 pgs.

"U.S. Appl. No. 13/827,779, Notice of Allowance dated Jun. 19, 2015", 5 pgs.

"U.S. Appl. No. 13/827,779, Preliminary Amendment filed Apr. 18, 2013", 3 pgs.

"U.S. Appl. No. 13/827,779, Response filed Apr. 22, 2015 to Non Final Office Action dated Dec. 23, 2014", 14 pgs.

"U.S. Appl. No. 13/827,779, Response filed Dec. 9, 2014 to Restriction Requirement dated Oct. 9, 2014", 13 pgs.

"U.S. Appl. No. 13/827,779, Restriction Requirement dated Oct. 9, 2014", 6 pgs.

"U.S. Appl. No. 13/827,779, Supplemental Notice of Allowability dated Jun. 8, 2015", 6 pgs.

"U.S. Appl. No. 14/804,038, Non Final Office Action dated Jan. 15, 2016", 17 pgs.

"U.S. Appl. No. 14/804,038, Notice of Allowability dated Aug. 24, 2016", 2 pgs.

"U.S. Appl. No. 14/804,038, Notice of Allowance dated May 17, 2016", 10 pgs.

"U.S. Appl. No. 14/804,038, Preliminary Amendment filed Aug. 28, 2015", 6 pgs.

"U.S. Appl. no. 14/804,038, Response filed Apr. 14, 2016 to Non Final Office Action dated Jan. 15, 2016", 14 pgs.

"International Application Serial No. PCT/US2013/073630, International Preliminary Report Patentability dated Jun. 18, 2015", 10 pgs.

"International Application Serial No. PCT/US2013/073630, International Search Report dated Feb. 21, 2014", 2 pgs.

"International Application Serial No. PCT/US2013/073630, Written Opinion dated Feb. 21, 2014", 8 pgs.

"Taiwanese Application Serial No. 102144987, Office Action dated Mar. 1, 2017", (w/ English Translation), 9 pgs.

Carlson, Leland A, et al., "Supported Film Superpressure Balloons", Report Nos. AFGL-TR-76-0306, BT-1044.10 Texas A&M, Winzen Research, Inc., Pumpkin Balloon Literature Search Prepared for Computer Sciences Corp, and NASA Wallops Flight Facility Jan. 31, 2000, (Oct. 1976), 3 pgs.

Lally, Vincent, "Balloon Materials", National Center for Atmospheric Research, Boulder, Colorado, NCAR Technical Notes, (Jun. 1967), 54-59.

Lally, Vincent, "Balloon Shapes and Stresses", National Center for Atmospheric Research, Boulder, Colorado, NCAR Technical Notes, (Jun. 1967), 3-5.

Lally, Vincent, "The Super Pressure Balloon—How It Flies", National Center for Atmospheric Research, Boulder, Colorado, NCAR Technical Notes, (Jun. 1967), 1-2.

Nishimura, J, "Activities for a Long Duration Flight System in Japan", Report No. BT-2476.06, 30th COSPAR, Pumpkin Balloon Literature Search, Prepared for Computer Sciences Corp. and NASA Wallops Flight Facility Jan. 31, 2000, (Jul. 1994), 4 pgs.

Raven Staff, "Heat Sealed Shell Assembly (Engineering Design and Specifications Document)", Raven Industries, Inc., Pumpkin Balloon Literature Search, Prepared for Computer Sciences Corp. and NASA Wallops Flight Facility Jan. 31, 2000, (Jan. 13, 2000), 4 pgs.

Rougeron, M, "Up to Date CNES Balloon Studies", Report No. BT-1156 or BT-1045.02, Pumpkin Balloon Literature Search, Prepared for Computer Sciences Corp. and NASA Wallops Flight Facility Jan. 31, 2000, (Aug. 1978), 8 pgs.

Schur, Willi W, "Analysis of Load Tape Constrained Pneumatic Envelopes", Report No. AIAA-99/1526, Pumpkin Balloon Literature Search, Prepared for Computer Sciences Corp. and NASA Wallops Flight Facility Jan. 31, 2000, (1999), 4 pgs.

Schur, Willi W, "Structural Analysis of Balloons Employing Various Techniques to Overcome Difficulties Posed by the Unconstrained Nature of these Systems", Report No. AIAA-96/0577, Pumpkin Balloon Literature Search, Prepared for Computer Sciences Corp. and NASA Wallops Flight Facility Jan. 31, 2000, (Jan. 1996), 2 pgs.

Schur, Willi W, "Super-Pressure Balloon-Designs where the Global

(56) References Cited

OTHER PUBLICATIONS

Pressure Containing Function is Primarily Assigned to the Load Tapes: The Pumpkin Balloon", Pumpkin Balloon Literature Search, Prepared for Computer Sciences Corp. and NASA Wallops Flight Facility Jan. 31, 2000, (Aug. 31, 1998), 4 pgs.

Scott, Pamela G, "Long Duration Balloon Technology Survey", Report Nos. WII-9942-01-TR-01, BT-2422 Winzen International, Inc., Pumpkin Balloon Literature Search Prepared for Computer Sciences Corp. and NASA Wallops Flight Facility Jan. 31, 2000, (Mar. 11, 1989), 2 pgs.

Sharma, Amok., "Floating a New Idea for Going Wireless, Parachute Included", Wall Street Journal, (Feb. 20, 2008), 3 pgs.

Smalley, J H, "Development of the e-Balloon", Report Nos. AFCRL-70/0543, BT-1040i16, AD-717 149, National Center for Atmospheric Research, Pumpkin Balloon Literature Search Prepared for Computer Sciences Corp. and NASA Wallops Flight Facility Jan. 31, 2000, (Jun. 1970), 9 pgs.

Smith, I Steve, et al., "Floating in Space", Scientific American, Pumpkin Balloon Literature Search, Prepared for Computer Sciences Corp. and NASA Wallops Flight Facility Jan. 31, 2000, (Nov. 1999), 2 pgs.

Smith, I S, "The Ultra Long Duration Balloon Project: A New Capability", Report No. AIAA-99/3866, Pumpkin Balloon Literature Search, Prepared for Computer Sciences Corp. and NASA Wallops Flight Facility Jan. 31, 2000, (Jun. 1999), 2 pgs.

Smith, M S, et al., "Development of Future Concepts and Plans for the ULDB Program", Report No. AIAA-99/3868, Raven Industries, Inc., Pumpkin Balloon Literature Search, Prepared for Computer Sciences Corp. and NASA Wallops Flight Facility Jan. 31, 2000, (Jun. 1999), 6 pgs.

Smith, Michael, "Multi-Gore Lobed Balloon", Raven Industries, Inc., Pumpkin Balloon Literature Search, Prepared for Computer Sciences Corp, and NASA Wallops Flight Facility Jan. 31, 2000, (Jul. 13, 1999), 4 pgs.

U of Minnesota Staff, "Research and Develpment in the Field of High Altitude Plastic Balloons—vol. IX", Report No. BR-1593; AD-68 416, University of Minnesota, Pumpkin Balloon Literature Search, Prepared for Computer Sciences Corp. and NASA Wallops Flight Facility Jan. 31, 2000, (Dec. 1953), 7 pgs.

Winker, J. A., "Pumpkins and Onions and Balloon Design", Adv. Space Res., 30(5), (2002), 1199-1204.

Winkler, J, "Poly "Pumpkin" Model Balloon Test (unpublished notes and photos)", Raven Industries, Inc., Pumpkin Balloon Literature Search, Prepared for Computer Sciences Corp. and NASA Wallops Flight Facility Jan. 31, 2000, (1959), 2 pgs.

Yajima, N, "A New Design and Fabrication Approach for Pressurized Balloon", 32nd COSPAR, Pumpkin Balloon Literature Search, Prepared for Computer Sciences Corp. and NASA Wallops Flight Facility Jan. 31, 2000, (Jul. 1998), 6 pgs.

Yajima, Nobuyuki, "A New Design Concept of Natural Shape Balloon for High Pressure Durability", Report No. AIAA-99-3380 1999 AIAA Conf., Pumpkin Balloon Literature Search, Prepared for Computer Sciences Corp. and NASA Wallops Flight Facility Jan. 31, 2000, (Jun. 1999), 8 pgs.

U.S. Appl. No. 14/995,629, Non Final Office Action dated Oct. 2, 2017, 12 pgs.

U.S. Appl. No. 15/013,177, Restriction Requirement dated Oct. 19, 2017, 5 pgs.

Taiwanese Application Serial No. 102144987, Response filed Sep. 4, 2017 to Office Action dated Mar. 1, 2017, (W/ English Claims), 63 pgs.

* cited by examiner

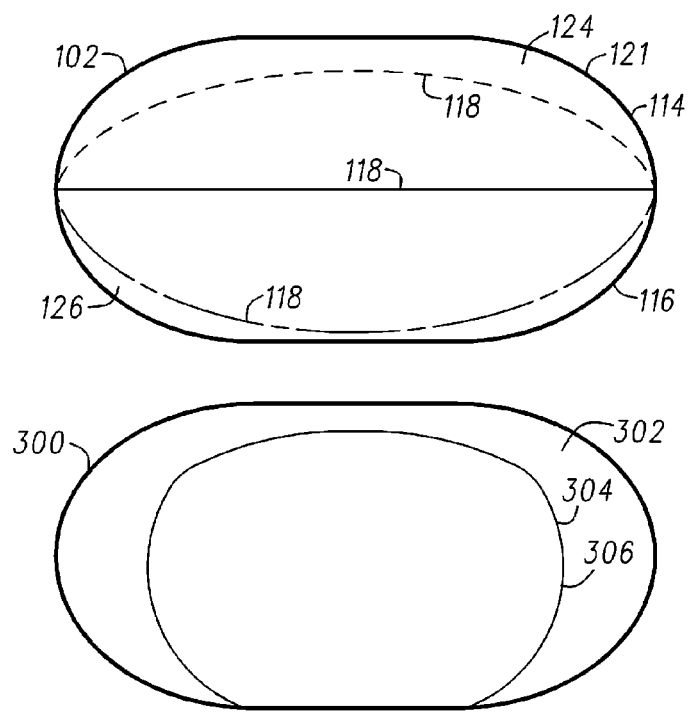
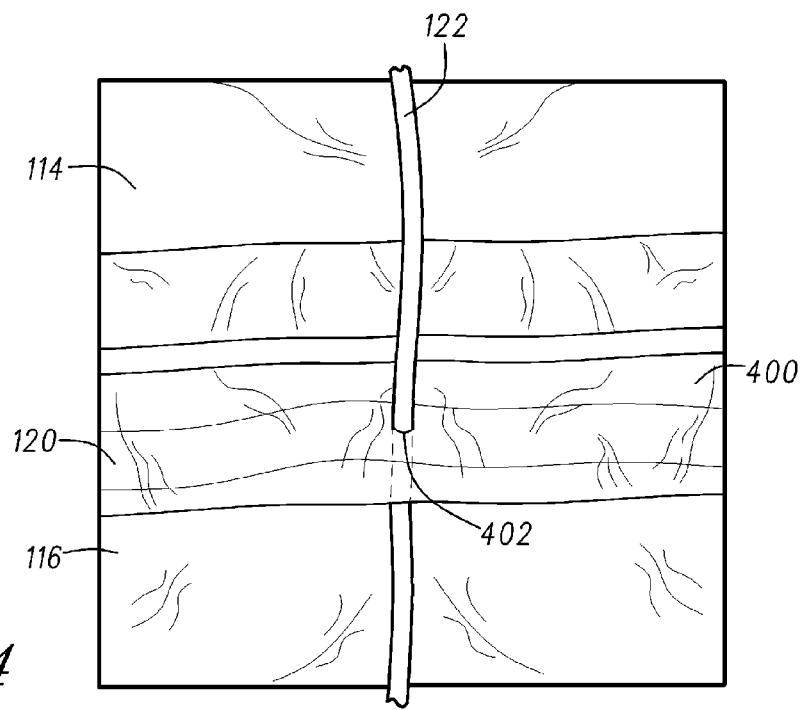
FIG. 3
FIG. 4

ATMOSPHERIC BALLOON SYSTEM

CLAIM OF PRIORITY

This patent application is a continuation-in-part of U.S. patent application Ser. No. 14/804,038, filed Jul. 20, 2015 which is a continuation of U.S. patent application Ser. No. 13/827,779, filed Mar. 14, 2013, which claims the benefit of priority, under 35 U.S.C. Section 119(e), to U.S. Provisional Patent Application Ser. No. 61/734,820, entitled "HIGH ALTITUDE BALLOON," filed on Dec. 7, 2012, which is hereby incorporated by reference herein in its entirety.

Further, this patent application is a continuation-in-part of U.S. Patent Application Ser. No. 62/128,309, filed. Mar. 4, 2015, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S.D. All Rights Reserved.

TECHNICAL FIELD

This document pertains generally, but not by way of limitation, to balloons and inflatable bladders having atmospheric applications.

BACKGROUND

Lobed balloons are used in high altitude ballooning. The shape of the lobed balloon has a relatively high curvature that allows for larger diameter balloons using relatively thin material for the balloon material. In at least some examples, payloads including instruments, communications equipment and the like are coupled with or suspended from the lobed balloon. The payloads are configured to conduct operations (e.g., observation, communication and the like) at the high altitudes lobed balloons reach, for instance an altitude of 20 miles.

Examples of lobed balloons are constructed with a lightweight material that is provided in diamond shaped panels of material (a gore pattern) that extend from top end to a bottom end and taper from near a midpoint toward the top and bottom ends. The diamond shaped panels are bonded to one another along their respective longitudinal edges to form the balloon. The balloon accordingly has a plurality of longitudinal seams extending from the top to the bottom of the balloon (one seam for each of the diamond shaped panels). The wider midpoint of each of the diamond shaped panels provides the outwardly curving shape of the balloon with respect to the narrower top and bottom ends. Optionally, a balloon is constructed with an upper and a lower panel coupled together along an edge.

OVERVIEW

The present inventors have recognized, among other things, that a problem to be solved can include minimizing the bonding and corresponding generation of multiple seams in a high altitude balloon (e.g., one or more of the balloon itself and a ballonet). Further, the inventors have recognized that a problem to be solved can include reducing time consuming and labor intensive assembly of a plurality diamond shaped (gore) panels to form a high altitude balloon.

In an example, the present subject matter can provide a solution to this problem, such as by coupling an upper pliable balloon panel having the upper apex of the balloon with a lower pliable balloon panel having the lower apex of the balloon. The upper and lower pliable balloon panels are coupled together at a circumferential edge of the balloon, as opposed to a plurality of longitudinal seams as with gore patterned balloons. The circumferential edge provides a single edge for bonding, stitching or the like, and accordingly avoids the time consuming and labor intensive alignment and bonding of each of a plurality of diamond shaped (gore) panels along their respective longitudinal edges. Additionally, the preassembly of the upper and lower pliable balloon panels is conducted in a single step by aligning the edge of the upper pliable balloon panel with corresponding edge of the lower pliable balloon panel. In another example, the hamlet includes upper and lower ballonet panels that are coupled along corresponding upper and lower perimeter edges. The coupled upper and lower perimeter edges form a single interface for bonding as opposed to multiple interfaces along longitudinal edges (e.g., with diamond shaped gores).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 are dual schematic views of the dual chamber balloon of FIG. 1 and a balloon including a nested ballonet.

FIG. 4 is a detailed view side view of the circumferential edge between upper and lower pliable balloon panels, with a plurality of tendons retained in a circumferential anchor.

DETAILED DESCRIPTION

Figure 1:
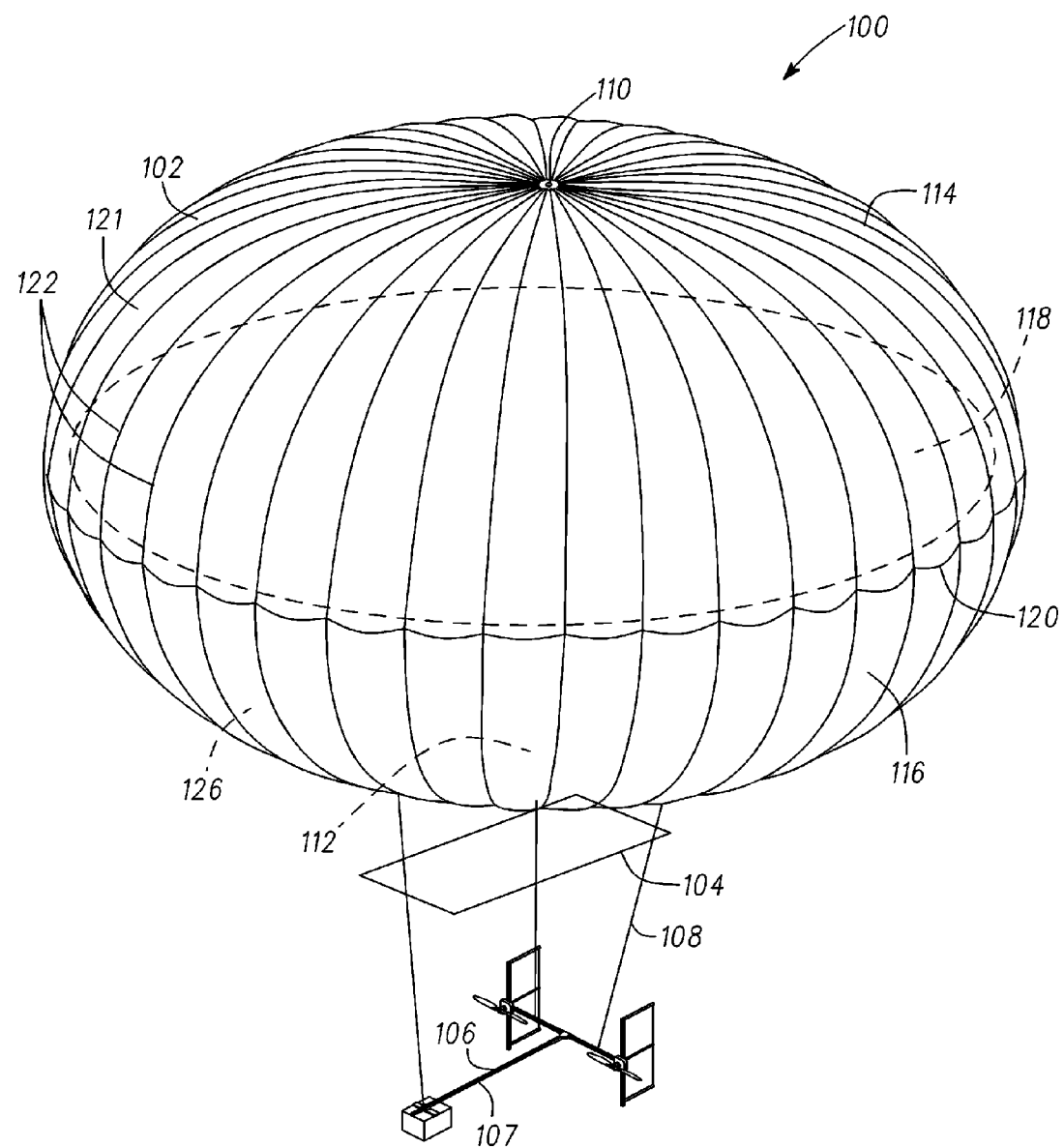
FIG. 1 is a perspective view of one example of a dual chamber balloon in an inflated configuration.

FIG. 1 shows one example of a high altitude balloon system 100. As shown the high altitude balloon system 100 includes a dual chamber balloon 102 (e.g., a pumpkin balloon or lobed balloon) coupled with a payload 104 and an optional propulsion system 106, for instance by one or more suspension lines 108. In the example shown in FIG. 1 the dual chamber balloon 102 is formed between an upper apex 110 and a lower apex 112. For instance, the dual chamber balloon 102 includes an upper balloon panel 114 extending from the upper apex 110 to a circumferential edge 120. A lower balloon panel 116 extends from the lower apex 112 to the circumferential edge 120. As will be described herein, in one example the upper and lower balloon panels 114, 116 are provided as discs or portions of discs and are accordingly sealed along the circumferential edge 120. Referring again to FIG. 1 the payload 104 is shown suspended beneath the dual chamber balloon 102 for instance on one or more suspension lines 108. In one example the payload 104 includes one or more of instruments, communication devices and the like configured to provide additional functionality to the high altitude balloon system 100. In one example, the high altitude balloon system 100 with the payload 104 is configured to provide observation beneath and around the high altitude balloon 100 as well as one or more communication features (e.g., transmission of information, reception of information and the like). In another example, the payload 104 comprises a framework suspended beneath the high altitude balloon system 100 including for instance an air ballast blower configured to provide atmospheric air to the air ballast chamber such as the air ballast chamber 126, a source of lighter-than-air gas configured to provide lighter-than-air gas (e.g., a lift gas such as helium or hydrogen) to a lift gas chamber 124 and the like. In another example the payload 104 includes a controller sized and shaped to control the relative volume of each of the dual chamber balloon chambers for instance the lift gas chamber 124 and the air ballast chamber 126 as will be described herein.

As further shown in FIG. 1, an optional propulsion system 106 is coupled with the high altitude balloon system 100. In one example the propulsion system 106 provides one or more sources of propulsion for instance propellers, guidance fins or the like as well as a power source configured to operate a motorized portion of the propulsion system such as one or more propellers. As will be described herein, in one example the propulsion system 106 includes two or more propellers optionally positioned away from the center of gravity of the high altitude balloon 100. The two or more propellers are thereby able to provide counteracting or cooperative torques to the high altitude balloon system 100 for instance the dual chamber balloon 102 to rotate the dual chamber balloon 102 and accordingly reorient the propulsion system 106 to provide at least limited directional control and propulsion to the high altitude balloon system 100.

Referring again to the view shown in FIG. 1, the dual chamber balloon 102 as previously described is formed in one example with upper and lower balloon panels 114, 116. Each of the upper and lower balloon panels 114, 116 cooperate to form a balloon outer surface 121. For instance, as shown the upper and lower balloon panels 114, 116 are coupled along a circumferential edge 120 for instance along a seam or edge seal provided by adhering, bonding, melting or the like the upper and lower balloon panels 114, 116 to each other along the circumferential edge 120. As further described herein, the dual chamber balloon 102 further includes a lift gas chamber 124 separated from an air ballast chamber 126.

The lift gas chamber and air ballast chamber 124, 126 are separated by way of a deflectable diaphragm 118 positioned within the dual chamber balloon 102. For instance, as shown in FIG. 1 the deflectable diaphragm 118 is coupled across the dual chamber balloon 102 and extends from the circumferential edge 120. In one example the deflectable diaphragm 118 is interposed between the upper and lower balloon panels 114, 116 at the time of construction of the dual chamber balloon 102. Accordingly as the circumferential edge 120 (e.g., a seam or edge seal formed the deflectable diaphragm 118 is coupled with each of the upper and lower balloon panels 114, 116 to accordingly form a triple layered dual chamber balloon 102 having the deflectable diaphragm 118 such as a pliable diaphragm panel interposed and coupled with each of the upper and lower balloon panels 114, 116. Accordingly the lift gas chamber 124 is formed by the upper balloon panel 114 and the deflectable diaphragm 118. That is to say the lift gas chamber 124 is formed by the balloon outer surface 121 (the portion of the balloon outer surface including the upper balloon panel 114) as well as the deflectable diaphragm 118. In a similar manner, the air ballast chamber 126 is formed by the balloon outer surface 121 (the portion of the outer surface including the balloon panel 116) in cooperation with the deflectable diaphragm 118. Stated another way, each of the lift gas chamber 124 and the air ballast chamber 126 are cooperatively formed by the balloon outer surface 121 and the deflectable diaphragm 118. Accordingly a separate ballonet or nested balloon within the dual chamber balloon 102 is not required. The deflectable diaphragm 118 minimizes the amount of material otherwise used for a ballonet and provides a lightweight separating feature for each of the lift gas chamber and the air ballast chamber 126 that is incorporated into the construction of the dual chamber balloon 102 (e.g., by interposition of the deflectable diaphragm 118 or coupling of the deflectable diaphragm 118 along the circumferential edge 120).

Optionally the deflectable diaphragm 118 is constructed with a piece of material having a similar or identical size to each of the upper and lower balloon panels 114, 116. Accordingly, as the dual chamber balloon 102 is inflated and put into operation the deflectable diaphragm 118 is deflectable within the dual chamber balloon 102 for instance within a dual chamber balloon volume to accordingly allow adjustment of each of the corresponding volumes of the lift gas chamber 124 and the air ballast chamber 126. That is to say the deflectable diaphragm 118 in one example allows for adjustment of each of the lift gas chamber volume and the ballast chamber volume from between 0 and 100 percent of the total dual chamber balloon volume (the dual chamber balloon volume being substantially constant throughout operation of the high altitude balloon system 100). In another example, one of the chambers 124, 126 has a smaller maximum proportion of the total dual chamber balloon volume (e.g., less than 100 percent, such as 10 percent or more). Accordingly, the other of the two chambers 124, 126 fills the remainder of the volume.

In another example, the deflectable diaphragm 118 is coupled across another portion of the balloon. For instance, the deflectable diaphragm 118 has a small r perimeter than either of the upper or lower balloon panels, and is accordingly coupled to either of the panels closer to either of the upper or lower apexes 110, 112, respectively. In still another example, the deflectable diaphragm is provided as a nested balloon formed of a light weight membrane within the dual chamber balloon 102. For instance, the diaphragm is coupled with the balloon 102 at one of the upper or lower apexes.

As further shown in FIG. 1, in one example a plurality of tendons 122 extend from the upper apex 110 to the lower apex 112. The plurality of tendons 122 are provided in a distributed fashion around the dual chamber balloon 102 and are accordingly provided to provide structural integrity to the dual chamber balloon 102 and maintain the dual chamber balloon volume at a constant level after inflation and during operation of the high altitude balloon system 100. As will be described herein, in one example the tendons 122 are cables, biodegradable filaments or the like fed through a plurality of orifices within the circumferential edge 120 to accordingly maintain the tendons 122 in a distributed fashion around the balloon outer surface 121. Accordingly the feature of the dual chamber balloon 102, such as the circumferential edge 120 incorporating the seam of each of the upper and lower balloon panels 114, 116 as well as the deflectable diaphragm 118, is in another example used as the anchoring or retaining feature to accordingly feed the tendons 122 there through and maintain the tendons 122 in a distributed fashion around the dual chamber balloon 102. In still another example, the plurality of tendons 122 include other features, for instance, an adhesive tape extending across the balloon outer surface 121. The tendons 122 are continuously or intermittently adhered along the outer surface 121 (e.g., from the upper to the lower apexes 110, 112) to enhance the structural integrity of the balloon and accordingly constrain expansion of the balloon 102 beyond the desired dual chamber balloon volume.

Figure 2:
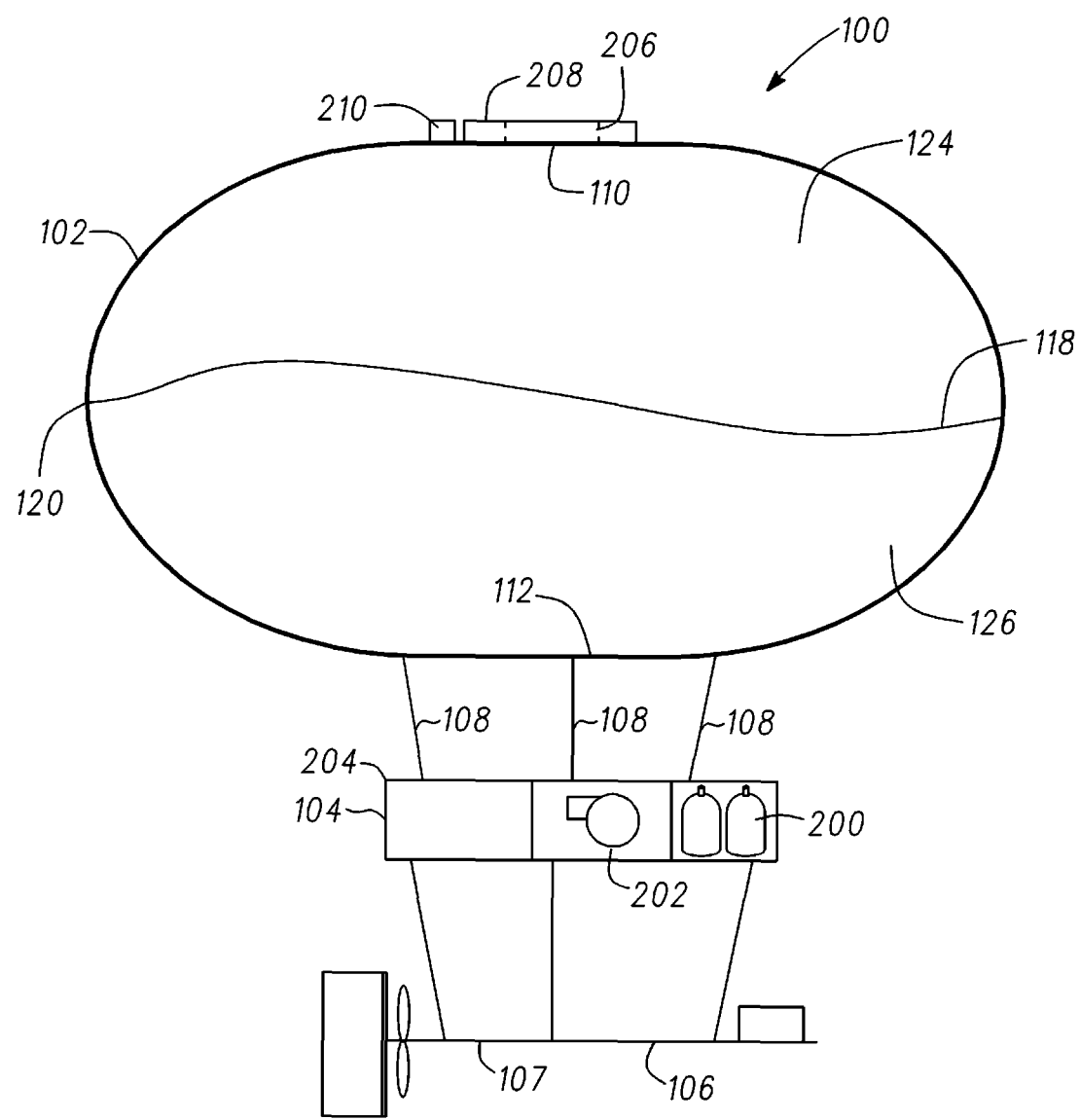
FIG. 2 is a schematic diagram of the dual chamber balloon of FIG. 1.

FIG. 2 shows a schematic view of the high altitude balloon system 100 previously shown in FIG. 1. In this example the payload 104 is shown suspended beneath the dual chamber balloon 102, for instance by one or more suspension lines 108. In another example, the payload 104 is coupled directly with the dual chamber balloon 102, for instance at a fitting of the lower apex 112. As shown in the example of FIG. 2, the payload 104 in one example includes a source of lighter-than-air gas 200. The source of lighter-than-air gas (e.g., one or more tanks or reservoirs of helium or hydrogen) is in communication with the lift gas chamber 124. That is to say, in one example an inflation tube or the like extends around or through the dual chamber balloon 102 to accordingly provide communication between the source of lighter-than-air gas 200 and the lift gas chamber 124. The source of lighter-than-air gas 200 optionally includes one or more tanks of helium, hydrogen or another light-than-air gas configured to accordingly inflate and maintain the lift gas chamber 124 at a desired altitude. Accordingly, as the lift gas chamber 124 deflates during operation for instance through permeation of the balloon outer surface 121 or active deflation of the lift gas chamber 124 the source of lighter-than-air gas 200 is configured to accordingly re-inflate the lift gas chamber 124 to a desired inflation volume (e.g., by operation of a control valve or other system optionally in communication with the control 204 described herein).

In a similar manner the air ballast chamber 126 is in one example in communication with an air ballast blower 202 provided with the payload 104 for instance a framework suspended beneath the dual chamber balloon 102 (or optionally coupled with the balloon 102 adjacent to the lower apex 112). In a similar manner to the source of lighter-than-air gas 200 the air ballast blower 202 is configured to provide supplemental air (or other ambient environmental gas) to the air ballast chamber 126 to accordingly allow for maintenance (or increasing) of the ballast chamber volume relative to the total volume of the dual chamber balloon 102.

In one example the air ballast blower 202 is controlled for instance by a controller 204 to accordingly inflate and deflate as needed to thereby adjust the altitude of the dual chamber balloon 102 during its operation. As shown for instance in FIG. 2 the deflectable diaphragm 118 deflects upwardly or downwardly with corresponding inflation and deflation of the air ballast chamber 126. For instance, in one example the controller 204 is configured to adjust the overall volume ratio between the air ballast chamber 126 and the lift gas chamber 124 relative to a substantially constant dual chamber balloon volume by operation of the air ballast blower 202. That is to say, by inflating and deflating the air ballast chamber 126 the corresponding volume of the lift gas chamber 124 is conversely adjusted to accordingly maintain the dual chamber balloon 102 at a static altitude, provide ascent, descent or the like.

As further shown in FIG. 2, in one example the dual chamber balloon 102 includes a pressure control valve 206 in combination with an optional deflation port 208. As shown, the pressure control valve 206 and the deflation port 208 are in one example provided at the upper apex 110 of the dual chamber balloon 102 as a unitary feature. The pressure control valve 206 is operated to accordingly maintain or change the pressure within the dual chamber balloon 102 for instance within the lift gas chamber 124. For instance, as a pressure within the lift gas chamber 124 rises or a pressure within the total volume of the dual chamber balloon for instance across each of the air ballast chamber 126 and the lift gas chamber 124 rises above a threshold pressure the pressure control valve 206 is operated either actively or automatically according to a mechanism or controller (e.g., the controller 204) to accordingly open and relieve pressure from within the dual chamber balloon 102. One example of an active pressure control valve 206 is described herein.

As further shown in FIG. 2 a deflation port 208 is optionally provided at the upper apex 110. The deflation port 208 is configured to rapidly deflate the dual chamber balloon 102 (e.g., the lift gas chamber 124) and accordingly facilitate the rapid descent of the high altitude balloon system 100 for instance upon the end of its operational lifetime. One example of a deflation port 208 is described herein.

In another example and as shown in FIG. 2, the dual chamber balloon 102 includes a remote disconnect coupling 210. The lift gas chamber 124 is inflated prior to operation with a reactive gas, such as hydrogen. The remote disconnect coupling 210 allows for remote inflation and a later remote disconnection of an inflation tube from the dual chamber balloon 102 without requiring user operation adjacent to the dual chamber balloon. For instance, the remote disconnect coupling 210 includes a mechanism (pneumatic, hydraulic or the like) thereon to automatically or upon a controller received input release the gas infusion tubing from the dual chamber balloon 102 and thereby facilitate the deployment of the high altitude balloon system 100 remotely without requiring adjacent user input.

FIG. 3 shows dual schematic views of balloons. The first view shows the dual chamber balloon 102 previously described herein. For instance, the dual chamber balloon 102 includes the deflectable diaphragm 118 shown in a variety of positions. A first position is shown with the diaphragm in solid lines and positioned approximately across the midpoint of the dual chamber balloon 102. Accordingly, the lift gas chamber 124 and the air ballast chamber 126 comprise substantially equal components of the overall dual chamber balloon volume. In a second position, the deflectable diaphragm 118 is shown deflected relatively upward (and in dashed lines) to accordingly decrease the lift gas chamber volume while at the same time the air ballast chamber volume is increased. As previously described, the component volumes of the air ballast chamber 126 and the lift gas chamber 124 when summed are substantially equal to the overall dual chamber balloon volume. Accordingly, with deflection of the deflectable diaphragm 118 into the upper position the lift gas chamber volume is minimized by the increased ballast chamber volume to accordingly facilitate descent of the high altitude balloon system 100 for instance to a desired altitude. Similarly, with deflection of the deflectable diaphragm 118 into a lower position (also shown in dashed lines in FIG. 3) the air ballast chamber volume is accordingly decreased and the lift gas chamber volume is accordingly increased. The dual chamber balloon 102 accordingly increases in buoyancy and the high altitude balloon system 100 is thereby raised or ascends to a desired altitude.

Referring now to the second view of FIG. 3, another example of a balloon 300 is provided. In this example the balloon 300 includes a lift gas chamber 302 and a ballonet 304 positioned therein. As shown the ballonet 304 is a nested balloon within the overall balloon 300. That is to say, the ballonet 304 comprises a separate sheet of material extending from for instance a lower apex of the balloon 300 to provide a separate balloon from the balloon 300. The ballonet perimeter 306 accordingly extends around substantially the entire balloon 300. Inflation of the ballonet 304, for instance with air or another heavier gas allows for a decrease of the overall volume of the lift gas chamber 302. Accordingly, with inflation and deflation of the ballonet 304 the balloon 300 is able to ascend or descend.

In contrast to the dual chamber balloon 102 previously described herein and further shown in the first view of FIG. 3, the ballonet 304 comprises a separate sheet of material and accordingly a separate balloon formed within the balloon 300. Instead of having the sheet of material for instance coupled across the dual chamber balloon 102 (e.g., at the circumferential edge or some other location within the balloon between the upper and lower apexes 110, 112) an entirely separate sheet of material must be provided to the balloon 300 to accordingly provide an inner or nested balloon. The ballonet perimeter 306 is accordingly substantially larger than the deflectable diaphragm 118 shown for instance in FIGS. 1, 2 and the first view of FIG. 3. Stated another way, the ballonet 304 does not rely on the balloon 300 to form an air ballast chamber 126. Instead, the ballonet 304 by itself forms a ballast chamber within the overall balloon 300. This dedicated chamber is accordingly not a part of the overall perimeter of the balloon 300. Instead a separate sheet of material with corresponding additional weight, coupling features between the ballonet 304 and the balloon 300 are provided. The balloon 300 is accordingly heavier and in at least some regards more difficult to construct than the dual chamber balloon 102 as described herein. For instance in one example the balloon 300 is formed with a plurality of gore panels or diamond shaped longitudinal panels extending from upper and lower apexes. An orifice is left in the balloon 300 to accordingly allow for feeding of the ballonet 304 into the balloon 300. The ballonet 304 is thereafter coupled at the lower apex of the balloon 300 for instance by one or more of stitching, sealing or the like.

In contrast to the balloon 300, the dual chamber balloon 102 provides the lift gas chamber 124 and the air ballast chamber 126 both as integral components to the dual chamber balloon 102 (e.g., formed in part by the balloon outer surface 121). For instance, each of the lift gas chamber 124 and the air ballast chamber 126 are cooperatively formed by the balloon outer surface 121 as opposed to a separate ballonet 304 as is the case with the balloon 300. The deflectable diaphragm 118, for instance a thin sheet of material interposed between the upper and lower balloon panels 114, 116, provides the separation between the lift gas chamber 124 and the air ballast chamber 126. The deflectable diaphragm 118 separates the chambers without requiring the significant amount of material needed to form a ballonet 304 shown in FIG. 3. Instead, the deflectable diaphragm 118 is incorporated into the construction and assembly of the dual chamber balloon 102 for instance by coupling of the deflectable diaphragm along the circumferential edge 120 (e.g., through incorporation within a seam or an edge seal). Accordingly each of the lift gas chamber 124 and the air ballast chamber 126 are cooperatively formed by the balloon outer surface 121 as well as the deflectable diaphragm 118. A nested balloon such as the ballonet 304 having increased material and additional weight relative to the deflectable diaphragm 118 is thereby not needed in the design of the dual chamber balloon 102.

FIG. 4 shows one example of a tendon 122, for instance one of a plurality of the tendons previously shown in FIG. 1. As shown the tendon 122 extends over a portion of the upper balloon panel 114 through a portion of the circumferential edge 120 and across the lower balloon panel 116. As previously described each of the tendons 122 in one example extends from the upper apex 110 to the lower apex 112 shown in FIG. 1. Referring now to FIG. 4 the representative tendon 122 is shown extending through the circumferential edge 120. In one example the circumferential edge 120 includes a circumferential retaining feature 400 provided therein (e.g., an anchoring orifice, mechanical fitting or the like). In one example, the circumferential retaining feature 400 is a separate piece of material incorporated into the circumferential edge 120 during construction of the dual chamber balloon 102. In another example, the circumferential anchor 400 is comprised of the laminated or coextruded materials of the upper and lower balloon panels 114, 116 (and optionally the deflectable diaphragm 118).

As shown for instance in FIG. 4 one or more retaining orifices 402 are provided through the circumferential retaining feature 400. The tendons 122 are fed through each of these retaining orifices 402 to accordingly position each of the tendons 122 circumferentially around the circumferential edge 120. As shown in FIG. 1, the plurality of tendons 122 are provided in a distributed fashion around the dual chamber balloon 102. The circumferential retaining feature 400 (optionally part of the circumferential edge 120) maintains the plurality of tendons 122 in this distributed arrangement.

In one example each of the plurality of tendons 122 are substantially non-pliable to accordingly ensure support is provided to the dual chamber balloon 102, for instance during operation and inflation of the dual chamber balloon. The tendons 122 as shown in FIG. 1 extend from the upper and lower apexes 110, 112. Accordingly the tendons 122 decrease hoop stress within the material of the dual chamber balloon 102 (e.g., in the upper and lower balloon panels 114, 116) and substantially constrain and thereby minimize or eliminate deflection of the balloon material (either of the panels 114, 116) during operation or inflation. Optionally, the plurality of tendons 122 are constructed with a material that is biodegradable. For instance as the high altitude balloon system 100 reaches the end of its operational lifetime the dual chamber balloon 102 is deflated thereby allowing the high altitude balloon system 100 to rapidly descend. Accordingly the tendons 122 are constructed in one example with a biodegradable material and upon deflation and depositing of the high altitude balloon system 100 (at ground level) the plurality of tendons 122 are configured to biodegrade wherever they may land. In still another example, the plurality of tendons 122 include an adhesive tape intermittently or continuously coupled along the dual chamber balloon 102, for instance between the upper and lower apexes 110. 112.

Figure 5:
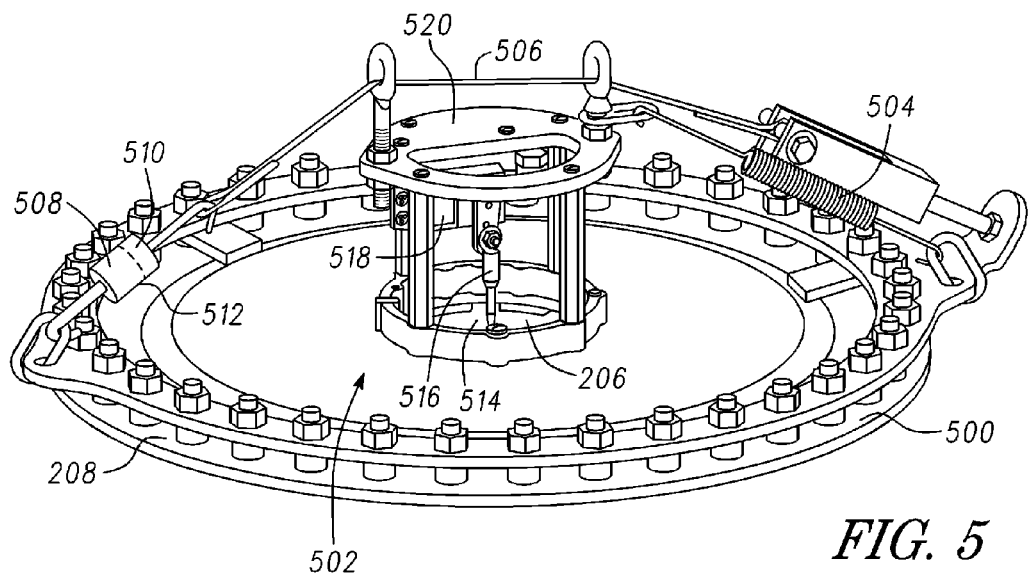
FIG. 5 is a perspective view of one example of a pressure control valve and a deflation port coupled with the dual chamber balloon.

FIG. 5 shows a perspective view of an assembly of the pressure control valve 206 and the deflation port 208 previously shown for instance in the schematic view of FIG. 2. Referring first to the pressure control valve 206, as shown in one example the pressure control valve 206 is housed within a valve tower 520 provided as part of the deflation port 208. For instance, the valve disc 514 is positioned within a portion of a valve flapper 502 of the deflation port 208. The valve disc 514 is movable in an upward and downward manner, for instance by operation of a valve arm 516 coupled and operated with a valve operator 518 (e.g., a motor configured to provide reciprocating motion such as by a crank that translates the valve arm 516). The valve operator 518 is coupled at one end of the valve tower 520 and accordingly moves the valve arm 516 in an upward and downward manner to accordingly close and open the valve disc 514 as needed for maintenance of a desired pressure or relief of pressure within the lift gas chamber 124 as shown in FIGS. 1 and 2. In one example, the valve operator 518 is coupled with or includes a communication device such as receiver or transceiver therein configured to communicate with the controller 204 to accordingly operate or cycle the valve arm 516 and the valve disc 514 to relieve or maintain pressure within the lift gas chamber 124 as needed for operation of the high altitude balloon system 100.

Referring again to FIG. 5, one example of a deflation port 208 is shown. The deflation port 208 includes a valve ring 500 housing a valve flapper 502 therein. In one example, the valve ring 500 has a diameter of approximately eight to ten inches to accordingly allow (after opening of the valve flapper 502) rapid deflation of the lift gas chamber 124 to provide rapid descent of the high altitude balloon system 100.

Referring again to FIG. 5, the valve flapper 502 is shown in a closed position where the valve flapper 502 is seated along the valve ring 500 (for instance the valve ring 500 has a deflectable seal such as a rubber seal, butyl seal or the like). As further shown in FIG. 5 the deflation port 208 further includes a system configured to maintain the valve flapper 502 in the closed position until such time that deflation of the dual chamber balloon 102 is desired. In the example shown a retaining feature 506 such as a cable, wire or the like extends across the valve ring 500 for instance over top of the valve tower 520 through a one or more eyelets. The retaining feature 506 is retained at either side of the valve ring 500 and accordingly holds the valve flapper 502 in the closed position. At least one flapper biasing element 504 is coupled between a portion of the valve ring 500 and a corresponding centrally mounted portion of the valve flapper 502. In the example shown in FIG. 5 the flapper biasing element 504 is coupled with the valve tower 520 and accordingly provides a moment to the valve flapper 502 that (without constraint of the valve flapper 502 by the retaining feature 506) allows the valve flapper to open.

The retaining feature 506 as shown herein further includes a destructible link 508 configured to sever at least a portion of the retaining feature 506 and thereby allow operation of the flapper biasing element 504. In the example shown a destructible link 508 includes a receiver 510 coupled with a severing element 512. The severing element 512 includes, but is not limited to, a heater configured to melt a link of the retaining feature 506, a cutting element or the like. The receiver 510 is in communication with the severing element 512 and upon the receipt of a severing signal the severing element 512 is operated to fracture the destructible link 508 (e.g., cut, melt or the like) and thereby separate the retaining feature 506. In one example the receiver 510 receives the severing signal from a controller, such as the controller 204 or from a remote location for instance the ground. Severing of the retaining feature 506 accordingly allows the flapper biasing element 504 to rotate the valve flapper 502 freely. Stated another way, the flapper biasing element 504 pulls the valve flapper 502 into the open configuration and thereby allows the valve ring 500 to rapidly pass lighter-than-air gas from the lift gas chamber 124. Accordingly, the lift gas chamber 124 rapidly deflates and the dual chamber balloon 102 rapidly descends to end the operation of the high altitude balloon system 100.

Figure 6:
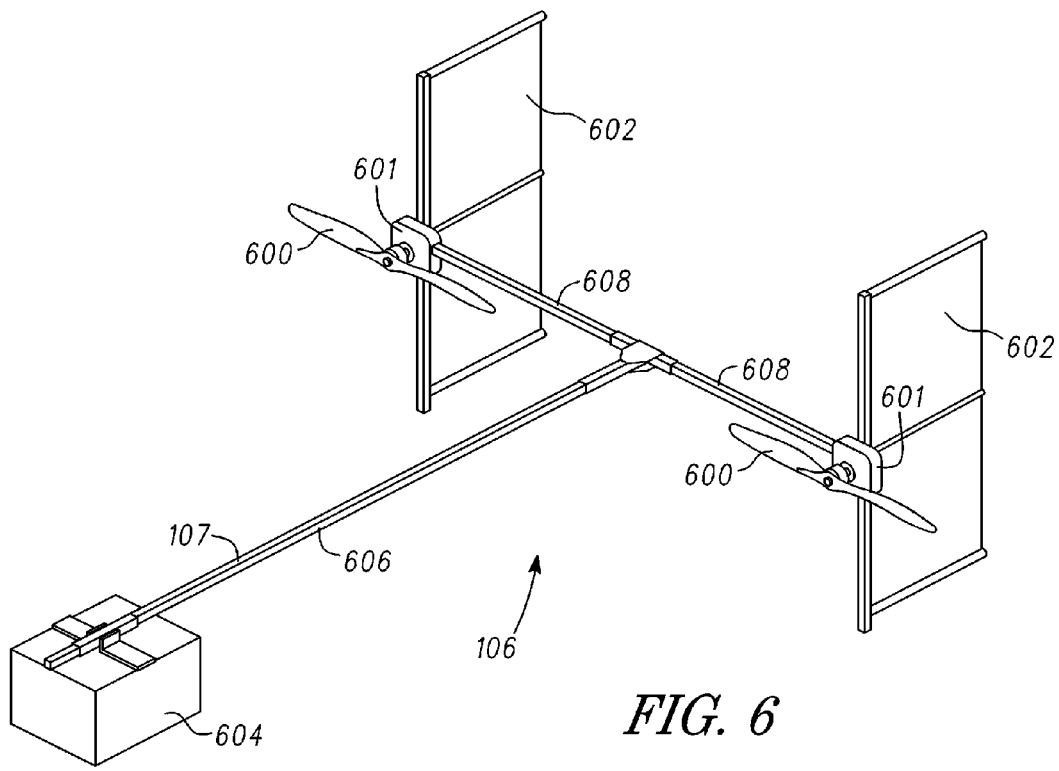
FIG. 6 is a perspective view of one example of a propulsion system.

FIG. 6 shows one example of the propulsion system 106 previously shown in FIGS. 1 and 2. As shown, the propulsion system 106 in this example provides dual propellers 600 positioned remotely by way of propeller arm 608 from a central beam 606. As further shown a power source 604 is provided at the end of a central beam 606 relative to each of the propellers 600. As will be described herein, in one example, the power source 604 is movable along the beam 606. As further shown in the example in FIG. 6 the propulsion system 106 optionally includes one or more guidance fins 602 positioned proximate to each of the propellers 600. In one example, at least the framework of the propulsion system 106 is constructed with a biodegradable material, such as balsa. At the end of the operational lifetime of the high altitude balloon system 100 the propulsion system 106 is substantially biodegradable and will decompose after the high altitude balloon system 100 is received at the ground. As previously described the propulsion system 106 is optionally suspended below the payload 104, as shown in FIGS. 1 and 2, in another example, the propulsion system 106 is consolidated with the payload 104, for instance into a single pod suspended from or attached to the dual chamber balloon 102. The propulsion system 106 includes one or more propellers 600. As shown in FIG. 6, the propulsion system 106 includes two propellers 600 positioned remotely relative to the central beam 606 by corresponding propeller arms 608. As shown, the propellers 600 are driven by corresponding motors 601 coupled with each of the propellers 600. In one example the motors 601 are coupled with the controller 204. In another example a separate controller or a dedicated controller is provided, for instance with the power source 604, to accordingly consolidate the operational and structural components of the propulsion system 106 into the system shown in FIG. 6. In one example where the power source 604 includes a controller for each of the propellers 600 therein the controller of the power source 604 is optionally in communication with the controller 204 shown in FIG. 2 or with another remote controller for instance on the ground.

In one example the propellers provide rotation and propulsion to the high altitude balloon system 100. For instance, one of the propellers 600 is operated in reverse relative to the other or at varying speeds to accordingly rotate the dual chamber balloon 102 to a different heading. After positioning the dual chamber balloon 102 along a desired heading for instance with the central beam 606 pointed along the desired heading the propellers 600 are optionally operated in concert (at the same or similar speeds) to accordingly propel the high altitude balloon system 100 in the desired direction. In another example, the guidance fins 602 cooperate with the propellers 600 to accordingly guide the propulsion system 106 and the corresponding high altitude balloon system 100 along a desired path. In still another example the guidance fins 602 include their own actuation features for instance one or more motors, actuators or the like configured to rotate the guidance fins 602 and provide additional control for rotation of the high altitude balloon system 100 and guidance of propulsion provided by the propellers 600.

As described above, in one example, the power source 604 is movably positioned along the central beam 606. For instance, one or more of the central beam 606 or the power source 604 include a drive configured to move the power source 604 along the central member. As the propellers 600 apply thrust to the high altitude balloon system 100 the system pitches upwardly, as the propellers apply a moment near to the lower apex 112 (see FIGS. 1 and 2). With the system described herein, the power source 604 is translated along the beam 606 to accordingly change the center of gravity of the high altitude balloon system and accordingly offset the moment provided by the propellers 600. Accordingly, thrust delivered to the high altitude balloon system by the propellers 600 is more accurately applied for directional control and guidance without undesirable changes in pitch.

Figure 7:
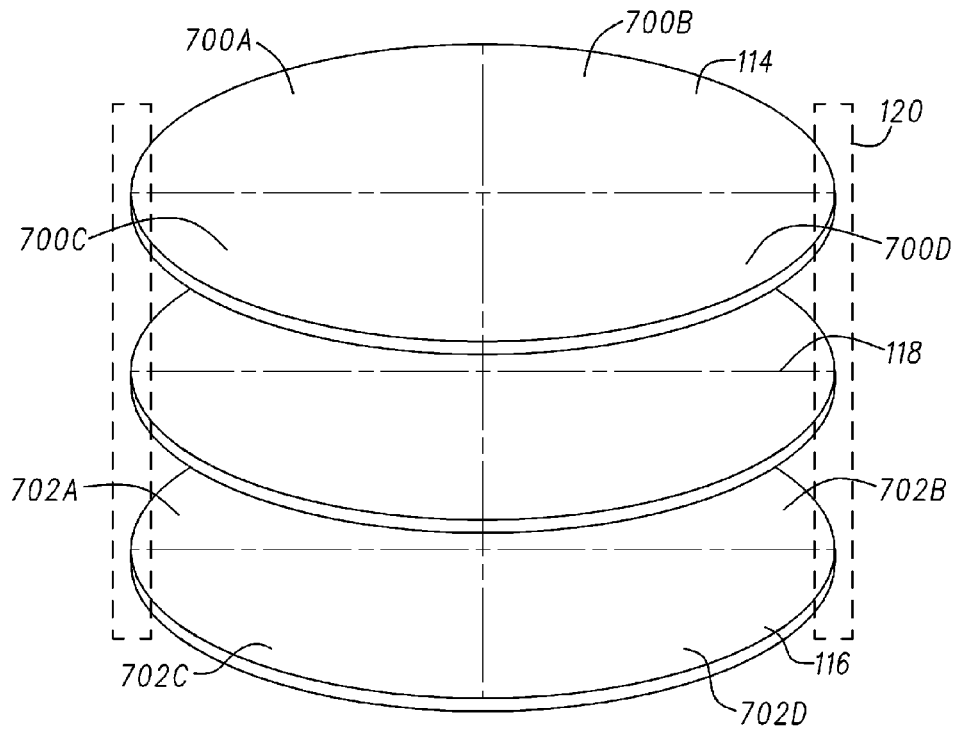
FIG. 7 is an exploded view of a plurality of pliable panels coincidentally aligned in a stacked configuration prior to assembly of the dual chamber balloon.

FIG. 7 shows an exploded view of each of the upper and lower balloon panels 114, 116 with the interposing deflectable diaphragm 118 (e.g., a pliable diaphragm panel) positioned therebetween. The circumferential edge 120, such as a seal forming the circumferential edges 120 are shown in dashed lines. As previously described in FIG. 1, each of the upper and lower balloon panels 114, 116 as well as the deflectable diaphragm 118 are assembled to form a dual chamber balloon 102 having a corresponding lift gas chamber 124 and separated air ballast chamber 126. The deflectable diaphragm 118 is coupled along the circumferential edge 120 to accordingly separate each of the lift gas chamber 124 and the air ballast chamber 126 from one another. Stated another way, the lift gas chamber 124 is in one example formed by the upper balloon panel 114 and the deflectable diaphragm 118 while the air ballast chamber 126 is formed by the lower balloon panel 116 and the deflectable diaphragm 118.

As shown each of the panels 114, 116 (as well as optionally the deflectable diaphragm 118) are provided as discs for instance circular discs oriented in a stacked configuration relative to one another. During assembly each of these discs is placed on top of the other and accordingly sealed or bonded together along the circumferential edge 120 to form the dual chamber balloon 102. Stated another way, in a single manufacturing step the stacked panels 114, 116, 118 are coupled together to form the dual chamber balloon 102 with the lift gas chamber 124 and the air ballast chamber 126. Time consuming stitching or bonding for instance along a plurality of longitudinal seams corresponding to each of one or more diamond configured or gore configured panels is thereby avoided. Further, the deflectable diaphragm is readily incorporated into the circumferential edge.

Optionally, one or more of the panels 114, 116, 118 are provided as one or more quartered or half panel sections 700A-D, 702A-D (and optionally quarter panels for the diaphragm 118). The sections laid on top of one another and then coupled along the circumferential edge 120 to form at least a portion of the balloon 121. Where each of the upper and lower balloon panels 114, 116 are separated into component sections such as the upper panel sections 700A-D and the lower panel sections 702A-D each of the corresponding sections of the upper and lower pliable balloon panels 114, 116 are coupled together along the circumferential edge 120 and then coupled together along the seams between each of the component panels such as the upper panel sections 700A-D and the corresponding lower panel sections 702A-D. Optionally, the order is reversed and the sections 700A-D, 702A-D (and optionally the diaphragm 118) are coupled along the seams between the panels to form the upper, lower and diaphragm panels 114, 116, 118 and then coupled along the circumferential edge 120.

In another example, because dual panels 114, 116 are used for each of the upper and lower balloon panels 114, 116 each of the panels is constructed with different materials. With the arrangement shown in FIG. 7, for instance with the plurality of panels stacked and then coupled together along the circumferential edge 120, different materials are optionally used for each of the panels. For instance, the upper and lower balloon panels 114, 116 are constructed with a thicker layer of material for instance to substantially protect the balloon 102 and prevent the egress of gases from the dual chamber balloon 102. In one example, the upper and lower balloon panels 114, 116 are formed with coextruded layers accordingly multiple layers) having a thickness of approximately about 3.0 millimeters. Optionally, each of the layers 114, 116 is constructed with a co-extrusion of polyethylene (e.g., two or more layers of polyethylene) with a layer of ethyl vinyl alcohol (EVOH) positioned provided in the coextrusion. In one example the ethyl vinyl alcohol substantially decreases the permeability of each of the upper and lower balloon panels 114, 116 and thereby facilitates the retention of gases within each of the lift gas chamber 124 and the air ballast chamber 126.

In another example, the deflectable diaphragm 118 is constructed with a thinner membrane for instance a membrane having approximately 0.5 millimeters of thickness. The deflectable diaphragm 118 substantially prevents the transmission of gases between each of the lift gas chamber 124 and the air ballast chamber 126 while at the same time easily allowing deflection of the diaphragm. Because the deflectable diaphragm 118 is not a portion of the balloon outer surface 121 the deflectable diaphragm 118 may be constructed with a thinner material that still maintains separation between each of the lift gas chamber 124 and the air ballast chamber 126.

In another example, each of the upper and lower balloon panels 114, 116 is formed with different materials. For instance the upper balloon panel 114, such as an upper pliable balloon panel is configured as a space-facing side of the dual chamber balloon 102 while the lower balloon panel 116 is constructed as a ground or earth-facing side of the dual chamber balloon 102. In one example, the upper balloon panel 114 is constructed with a heat reflective material to accordingly increase the heat reflectivity of the dual chamber balloon 102 relative to a lower heat reflectivity in the lower balloon panel 116. Accordingly heating of the dual chamber balloon 102, for instance by solar radiation, is accordingly attenuated with the heat reflective material, in a contrasting manner, the lower balloon panel 116 is in one example constructed with a heat absorbent material configured to accordingly absorb heat such as heat radiated from the ground. The heat absorbency of the lower balloon panel 116 (e.g., a lower pliable balloon panel) is thereby increased relative to the upper panel 114. The dual chamber balloon 102 with varying heat reflectivity and heat absorbency between the upper and lower panels 114, 116 is able to accordingly attenuate temperature changes during operation in a day and night cycle.

The table provided below provides additional material options that are combinable in one or more permutations according to the particular application of the high altitude balloon system. Each of the upper and lower balloon panels 114, 116, as well as the deflectable diaphragm 118 is optionally constructed with one or more these materials or combinations of these materials. As discussed above, each of the panels is optionally constructed with differing materials (e.g., optionally with some identical constituent components and other differing components).

| High Altitude Balloon Panel Material Selection |
| --- |
| Base Balloon Panel |
| Polyethylene<br>Nylon<br>Polyester<br>Saran<br>co-extrusion of laminate of one or more<br>Other Panel Options |
| Anti-Static Films or Coatings<br>Biodegradable Films<br>EVOH<br>Upper Balloon Panel |
| Metalized Coating<br>White or Light Pigment<br>Lower Balloon Panel |
| Thermal Absorbent Material<br>Black or Dark Pigment |

Figure 8:
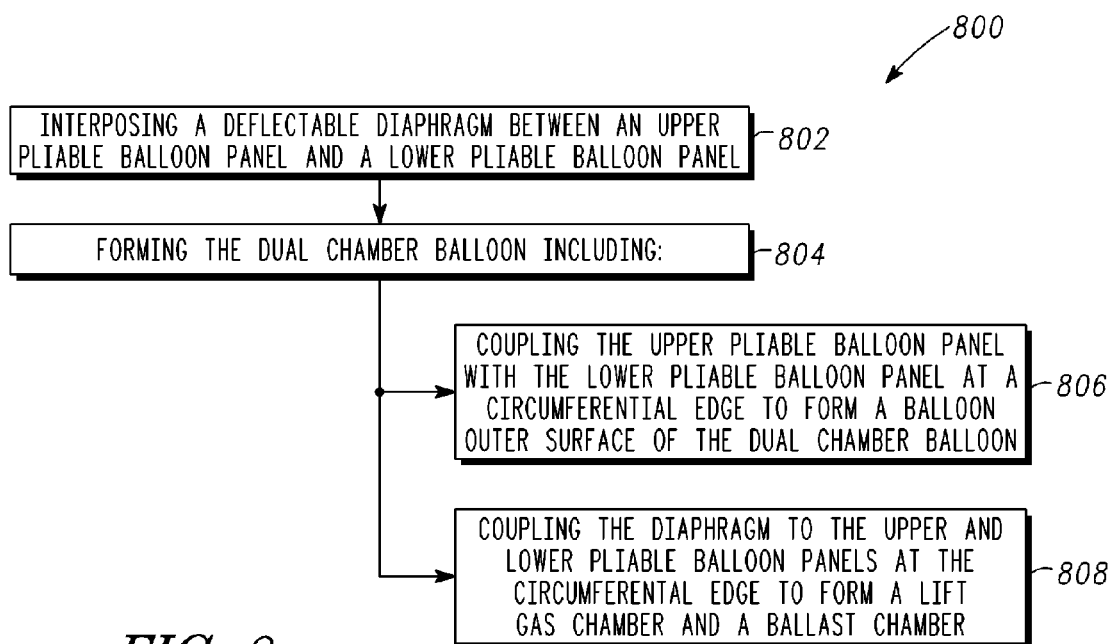
FIG. 8 is a block diagram showing one example of a method of making a dual chamber balloon.

FIG. 8 shows one example of a method 800 for making a high altitude balloon system, such as the system 100 previously shown in FIGS. 1 and 2. In describing the method 800 reference is made to one or more components, features, functions, steps or the like described herein. Where convenient, reference is made to the components, features, functions, steps and the like with reference numerals. Reference numerals provided are exemplary and are not exclusive. For instance, the features, components, functions, steps and the like described in the method 800 include but are not limited to the corresponding numbered elements, other corresponding features described herein (both numbered and unnumbered) as well as their equivalents.

At 802, the method 800 includes interposing a deflectable diaphragm such as a pliable diaphragm panel between an upper pliable balloon panel 114 and a lower pliable balloon panel 116. In one example, the deflectable diaphragm 118 is shown for instance in FIGS. 1 and 2 coupled along a circumferential edge between each of the upper and lower balloon panels 114, 116. The upper and lower pliable balloon panels 114, 116 include respective upper and lower apexes 110, 112. The panels extend from the upper and lower apexes to the circumferential edge 120 where they are coupled together.

Accordingly at 804, the method 800 includes forming the dual chamber balloon 102. In one example forming the dual chamber balloon includes coupling the upper pliable balloon panel 114 with the lower pliable balloon panel 116 at the circumferential edge 120 to form a balloon outer surface 121 of the dual chamber balloon 102. As shown in FIGS. 1 and 2 and previously shown in the exploded view of FIG. 7 the upper and lower pliable balloon panels 114, 116 are arranged in a stacked configuration prior to assembly. In another example the upper and lower pliable balloon panels 114, 116 are discs of material and coupling along the circumferential edge 120 correspondingly forms the entirety of the balloon outer surface 121. In another example, where each of at least the upper and lower balloon panels 114, 116 (and optionally the deflectable diaphragm 118) are separated into component sections such as the upper panel sections 700A-D and the lower panel sections 702A-D each of the corresponding sections of the upper and lower pliable balloon panels 114, 116 are coupled together along the circumferential edge 120 and then coupled together along the seams between each of the component panel sections 700A-D, 702A-D.

In another example forming the dual chamber balloon further includes at 808 coupling the deflectable diaphragm 118 to the upper and lower pliable balloon panels 114, 116 at the circumferential edge 120 to form a respective lift gas chamber 124 and an air ballast chamber 126. That is to say, the air ballast chamber 126 is separated from the lift gas chamber 124 by way of the deflectable diaphragm 118 extending across the dual chamber balloon 102 from the circumferential edge 120. The lift gas chamber 124 is formed by the upper pliable balloon panel 114 and the deflectable diaphragm 118 and the air ballast chamber 126 is conversely formed by the lower balloon panel 116 and the deflectable diaphragm 118. Optionally, the deflectable diaphragm 118 extends around the dual chamber balloon, for instance the diaphragm 118 is coupled along an inner surface of one of the upper or lower balloon panels 114, 116.

In one example coupling of the upper pliable balloon panel 114 with the lower pliable balloon panel 116 along with coupling the deflectable diaphragm 118 to each of the upper and lower pliable balloon panels occurs at substantially the same time. For instance, as shown in FIG. 7 each of the upper and lower pliable balloon panels 114, 116 are provided in a stacked configuration with the deflectable diaphragm 118 interposed therebetween. Where each of the panels is constructed with a substantially identical size the circumferential edge 120 for instance a seam or edge seal is formed at the outer perimeters of each of the panels 114, 116, 118 to accordingly form the dual chamber balloon 102 and the separate lift gas chamber 124 and air ballast chamber 126 therein. As discussed above, the deflectable diaphragm 118 has a smaller perimeter and is accordingly coupled with one of the panels 114, 116 (e.g., closer to one of the respective upper or lower apexes 110, 112).

Several options for the method 800 follow. In one example, the method 800 further includes selecting a first material for the upper pliable balloon panel 114 such as a heat reflective material (e.g., having a greater heat reflectivity than the lower pliable balloon panel 116). Additionally, the method 800 further includes in selecting a second material for the lower pliable balloon panel that is different from the first material of the upper pliable balloon panel 114. For instance, the second material for the lower pliable balloon panel 116 is selected for heat absorbency and accordingly has a higher heat absorbency relative to the upper balloon panel 114.

In another example, the method 800 further includes forming one or more laminated or coextruded films for each of the upper and lower balloon panels 114, 116. Optionally forming of the laminates or coextrusions of the upper and lower balloon panels 114, 116 includes coextruding one or more of the upper or lower pliable balloon panels 114, 116 with a layer of ethyl vinyl alcohol (EVOH). In one example, EVOH along with polyethylene forms a three layer film for use in the upper and lower balloon panels 114, 116. That is to say, in one example two layers of polyethylene are provided with an interposing layer of EVOH positioned therebetween. In other examples, the upper and lower balloon panels 114, 116 are formed with one or more other materials or combinations of materials to accordingly provide different material properties and balloon performance characteristics (in either or both of the upper and lower pliable balloon panels 114, 116) to the high altitude balloon system 100.

In another example coupling the deflectable diaphragm 118 to the upper and lower pliable balloon panels 114, 116 at the circumferential edge 120 includes forming a lift gas chamber having a first lift gas chamber volume and forming the ballast chamber with a second ballast chamber volume. Each of the lift gas chamber volume and the ballast chamber volume form a component of the dual chamber balloon volume of the dual chamber balloon 102. Accordingly, with selective inflation and deflation, for instance of the ballast chamber 126 as shown in FIGS. 1 and 2, the volume of the lift gas chamber 124 is accordingly inversely changed. For instance, where descent of the high altitude balloon system 100 is desired the air ballast chamber 126 is inflated with the air ballast blower 202 shown in FIG. 2 to accordingly increase the ballast chamber volume and accordingly decrease the lift gas chamber volume. Accordingly, the dual chamber balloon 102 becomes less buoyant and the high altitude balloon system 100 descends.

Conversely, where ascent of the dual chamber balloon 102 is desired the air ballast chamber volume is decreased and the decrease in the volume correspondingly allows the lift gas chamber volume to increase. As the lift gas chamber 124 enlarges the dual chamber balloon 102 accordingly becomes more buoyant and the high altitude balloon system 100 correspondingly ascends to a higher altitude. In each of these scenarios the dual chamber balloon volume 102 remains substantially the same volume while the component volumes provided by the lift gas chamber 124 and the air ballast chamber 126 change to accordingly alter the buoyancy of the dual chamber balloon 102.

In another example, the method 800 includes coupling a plurality of tendons 122 (lines, filaments, taper or the like) over the balloon outer surface 121 of the dual chamber balloon 102. As previously described and shown for instance in FIGS. 1 and 4 each of the plurality of tendons 122 optionally extend from near the upper apex 110 to near the lower apex 112 and cross the circumferential edge 120. In another example, coupling the plurality of tendons 122 further includes retaining one or more of the plurality of tendons 122 along the circumferential edge 120. For instance referring to FIG. 4 the plurality of tendons 122 are retained for instance within retaining orifices 402 formed in a circumferential retaining feature 400 (e.g., a flange of material) of the circumferential edge 120. Accordingly the plurality of tendons 122 are maintained in a distributed arrangement around the dual chamber balloon 102 according to the retention optionally provided at the circumferential edge 120.

In another example, the method 800 includes coupling a deflation port such as the deflation port 208 shown in FIG. 2 with the dual chamber balloon 102 adjacent to the lift gas chamber 124. One example of the deflation port 208 is shown in FIG. 5. In this example the deflation port 208 includes a valve flapper 502 rotatably coupled with a valve ring 500. As further shown a biasing element, such as a flapper biasing element 504, is configured to bias the valve flapper toward an open position to accordingly facilitate deflation of the lift gas chamber 124 and provide rapid descent of the dual chamber balloon 102 for instance at the end of the operational lifetime of the high altitude balloon system 100. As further shown in FIG. 5 a retaining feature 506 is applied across the valve flapper 502 to accordingly the valve flapper 502 in a closed position. Disengagement of the retaining feature allows the biasing mechanism 504 to move the valve flapper 502 to the open position. In one example, the retaining feature 506 includes a feature such as a destructible link 508 configured to remotely sever the retaining feature 506 and free the flapper biasing element 504 to open the valve flapper 502.

In still another example, the method 800 further includes coupling a propulsion system, such as the propulsion system 106 with the dual chamber balloon 102. As shown for instance in FIG. 1, the dual chamber balloon 102 has a gondola 107 including the propulsion system 106 thereon suspended from the dual chamber balloon by way of suspension lines 108. The propulsion system 106 is configured to provide directional control of the dual chamber balloon 102 for instance by way of rotation (the application of torque to the dual chamber balloon) and propulsion through the cooperative application of thrust through one or more propulsion elements to the dual chamber balloon 102. As described herein, in one example, the propulsion system includes a power source 604 or weight movably positioned along the central beam 606 of the gondola 108. Optionally, the method 800 includes translating the power source 604 or weight along the central beam to corresponding change the center of mass of the high altitude balloon system 100 and accordingly adjust pitch (e.g., during the application of thrust from the propulsion system 106).

In still another example the method 800 further includes installing the dual chamber balloon 102 within a remote launch system prior to inflation. In one example the remote launch system (described in more detail herein) includes a launch chamber configured to hold the dual chamber balloon therein during at least a portion of inflation of the balloon. An optional anti-static charge system is configured to minimize static electricity buildup along the dual chamber balloon especially during inflation. Optionally installing the dual chamber balloon within the remote launch system includes coupling an inert gas source (e.g., a reservoir of inert gas, anti-static media, humidified gas or the like) and a gas distribution mechanism with the launch chamber. The inert gas source and the gas distribution mechanism provide an environment within the launch chamber configured to substantially suppress or eliminate static electricity along the dual chamber balloon 102. Accordingly where the dual chamber balloon is inflated with a lighter-than-air gas such as hydrogen the anti-static system (and an optional ground)

in combination with the gas distribution mechanism correspondingly minimizes the buildup of electrostatic charge and minimizes the combustible environment around the dual chamber balloon to minimize the chance of combustion of the dual chamber balloon 102 and the hydrogen therein.

Figure 9:
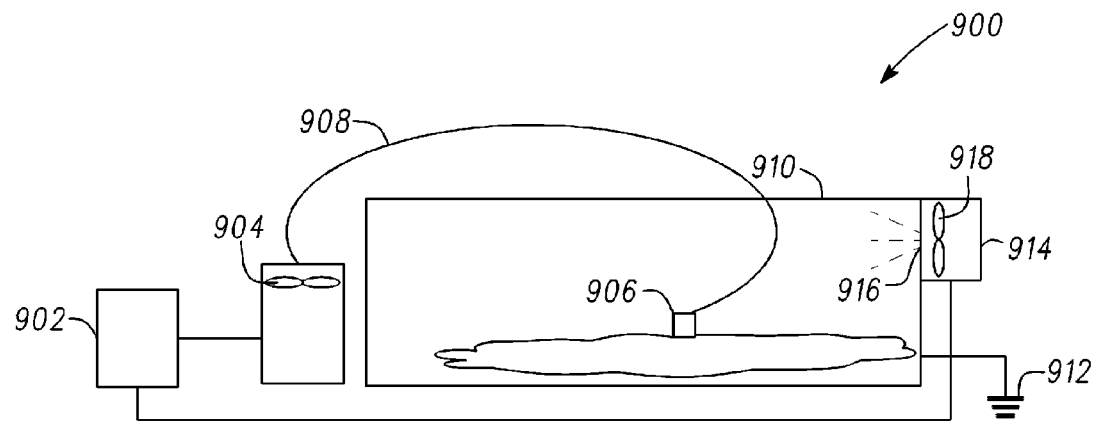
FIG. 9 is a schematic view of one example of a remote launch system configured to remotely inflate and launch a dual chambered balloon.

In another example, and as shown in FIG. 9, the high altitude balloon system 100 described herein further includes a remote launch system 900 that inflates at least the lift gas chamber 124 of the dual chamber balloon 102. The remote launch system 900 allows for inflation of the dual chamber balloon 102 in a safe and remote manner. The dual chamber balloon 102 is shown in a deflated and stored configuration within a launch chamber 910 of the system 900.

The remote launch system 900 includes a controller 902 in communication with a reservoir of lighter than air gas 904 (e.g., a lift gas such as helium, hydrogen or the like). Optionally, the controller 902 is itself remote from the remainder of the remote launch system 900 and accordingly controls one or more of the features described herein from wired or wireless communication. The controller 900 initiates and controls inflation of the dual chamber balloon 102 (e.g., at least the lift gas chamber 124) through gas tubing 908 connected between the reservoir of lighter than air gas 904 and an optional remote disconnect coupling 906 at the dual chamber balloon 102. As shown in FIG. 9, the gas tubing 908 extends through the launch chamber 910 housing the stored dual chamber balloon 102 therein. Optionally, the controller 902 communicates with a blower or pump associated with the reservoir of lighter than air gas 904 to initiate and control inflation of the dual chamber balloon 102.

In one example, the launch chamber 910 includes a sealed environment surrounding the dual chamber balloon 102 during at least a portion of its inflation. Optionally, the launch chamber 910 includes one or more mechanisms configured to minimize static charge or decrease the likelihood of combustion in the environment within the chamber including the dual chamber balloon 102. For instance, the launch chamber 910 (and optionally the balloon 102) is grounded at 912 as shown. In another example, the remote launch system 900 includes a reservoir of inert gas 914 and a distribution mechanism 918, such as a blower, for distributing the inert gas into the launch chamber 910 through an inert gas inlet 916. The inert gas reservoir 914 includes, but is not limited to, one or more inert or noble gas decreased likelihood of combustion), humidified gas, an aerosol with anti-static properties and the like.

During inflation, one or more of the ground 912 and the inert gas reservoir 914 (or other anti-static medium) and the distribution mechanism 918 cooperate to minimize any static charge build up on the dual chamber balloon 102. Immediately after or at some point during inflation the dual chamber balloon 102 is released from the launch chamber 910. The application of one or more of inert gas an anti-static medium or the like and grounding ensure that the dual chamber balloon 102, upon being exposed to ambient atmosphere, does not have sufficient static charge to trigger an electrical arc that could cause combustion of the lift gas (e.g., hydrogen) or the balloon 102. Optionally, the use of an inert gas minimizes the risk of combustion within the launch chamber 910 and around the balloon 102 immediately after deployment from the chamber 910. In still another example, the remote launch system 900 includes a hydrogen gas detection monitor configured to measure and optionally provide an alert if a hydrogen leak is present in either of the launch chamber 910 or the dual chamber balloon 102.

Figure 10:
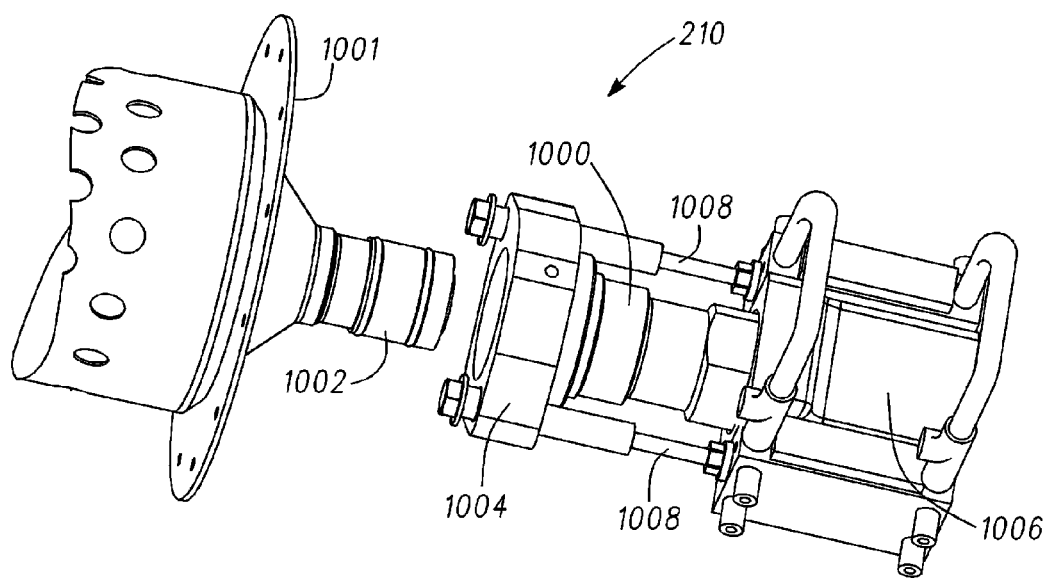
FIG. 10 is a perspective view showing one example of a remote disconnect coupling.

Referring now to FIG. 10, one example of a remote disconnect coupling 210 is provided. As shown, the remote disconnect coupling 210 includes a nozzle receptacle 1000 sized and shaped to receive a port nozzle 1002 of an inflation port 1001 coupled with the dual chamber balloon 102 (e.g., the lift gas chamber 124). Additionally, the remote disconnect coupling 210 includes in the example shown a disconnect collar 1004 movably coupled around the nozzle receptacle 1000. The disconnect collar 1004 is sized and shaped to engage with the portion of the port nozzle 1002 at the inflation port 1001 to allow for remote disconnecting of gas tubing 908 (see FIG. 9) extending from the lift gas reservoir 904, for instance by movement of the disconnect collar 1004 relative to the nozzle receptacle 1000.

As further shown in FIG. 10, an actuator housing 1006 is coupled with the disconnect collar 1004. For instance, the actuator housing 1006 includes one or more actuators 1008 sized and shaped to move the disconnect collar 1004 relative to the nozzle receptacle 1000. In one example, the actuators 1008 includes a plurality of pistons and cylinders (e.g., air or hydraulic) that receive air under pressure or hydraulic fluid. In one example, the actuators 1008 include but are not limited to air cylinders having pistons disposed therein. The actuator pistons are shown coupled between the actuator housing 1006 and the disconnect collar 1004.

In operation, as the dual chamber balloon 102 is inflated to the configuration shown in FIG. 1 a controller opens a valve allowing for the delivery of air (or cessation of delivery of air) to the actuator housing 1006 of the remote disconnect coupling 210, for instance the actuators 1008. In one example, the dual chamber balloon 102 is inflated within the launch chamber 910 of the remote launch system 900, and the controller includes the controller 902 shown in FIG. 9. With an actuation instruction from the controller 902 the actuators 1008 correspondingly move the disconnect collar 1004. In one example, movement of the actuators 1008 causes contraction of pistons relative to the actuator housing 1006 and correspondingly moves the disconnect collar 1004 toward the actuator housing 1006 and away from the port nozzle 1002. This relative movement of the disconnect collar 1004 correspondingly disconnects the remote disconnect coupling 210 from the port nozzle 1002 of the inflation port 1001. For example, the disconnect collar 1004 includes a detent therein and movement of the disconnect collar 1004 threes a spring biased ball out of engagement with the detent. Because the dual chamber balloon 102 is in the fully inflated position shown in FIG. 1 the weight of the remote disconnect coupling in combination with the operation of the disconnect collar allows the port nozzle to detach from the remote disconnect coupling and the coupling falls away from the atmospheric balloon system according to gravity.

In one example, the remote disconnect coupling 210 is able to act and thereby disconnect itself from the high altitude balloon system 100, for instance, at the inflation port 1001 without operation by an operator. Stated another way, an operator is not needed to climb to the inflation port 1001 and disconnect the gas tube 908 from the dual chamber balloon 102. Instead, the operator actuates the remote disconnect coupling 210, for instance from the controller 902. Optionally, the controller 902 operates the remote disconnect coupling automatically upon determining (e.g., through pressure measurements provided through pressure tubing) that inflation of the dual chamber balloon is complete. Optionally, the remote disconnect coupling is used for one or both of the lift gas chamber 124 and for filling of the air ballast chamber 126.

Figure 11:
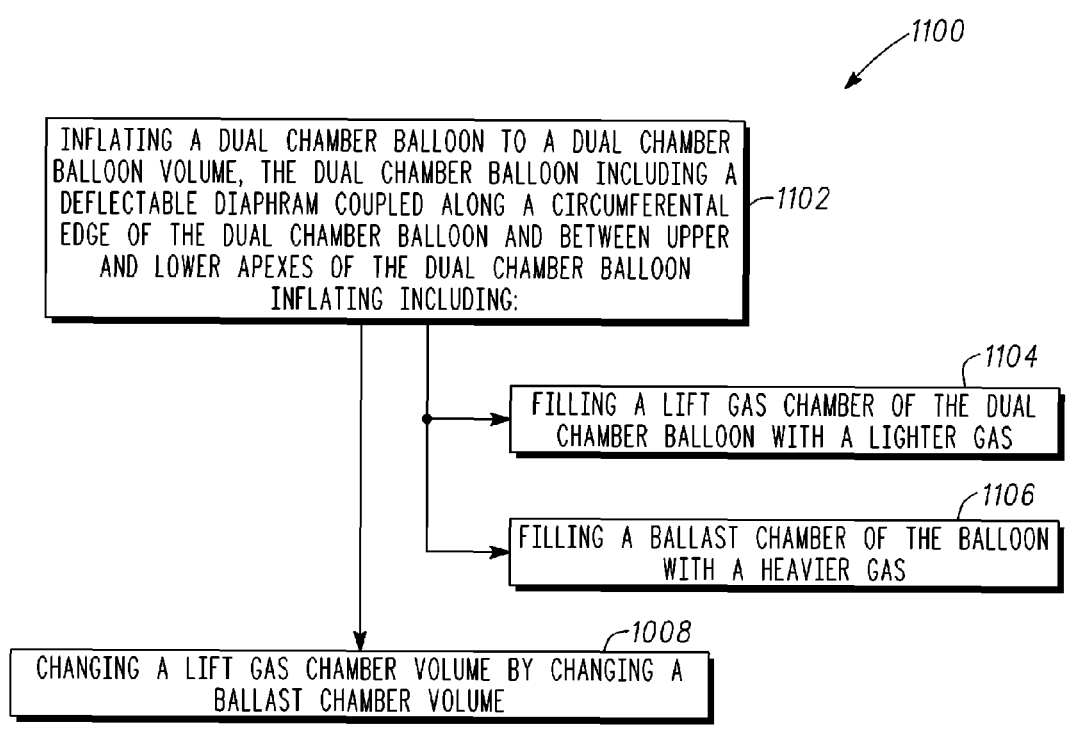
FIG. 11 is a block diagram showing one example of a method for using a dual chamber balloon.

FIG. 11 shows one example of a method 1100 for using a high altitude balloon system such as the system 100 shown in FIGS. 1 and 2. In describing the method 1100 reference is made to one or more components, features, functions, steps and the like described herein. Where convenient, reference is made to the components, features, steps, functions and the like with reference numerals. Reference numerals provided are exemplary and are not exclusive. For instance the features, components, functions, steps and the like described in the method 1100 include but are not limited to the corresponding numbered elements, other corresponding features described herein (both numbered and unnumbered) as well as their equivalents.

At 1102, the method 1100 includes inflating a dual chamber balloon 102 to a dual chamber balloon volume. The dual chamber balloon 102 includes a deflectable diaphragm 118 coupled along a circumferential edge 120 of the dual chamber balloon 102, as shown for instance in FIG. 1. In FIG. 2, the deflectable diaphragm 118 is coupled between the upper and lower apexes 110, 112 of the dual chamber balloon for instance along a circumferential edge 120 or another portion of one of the panels 114, 116, as described herein.

Inflating of the dual chamber balloon 102 includes, in at least one example at 1104, filling the lift gas chamber 124 of the dual chamber balloon 102 with a lighter than air gas (e.g., a lift gas). At 1106, the ballast chamber 126 of the balloon 102 is filled with a heavier gas (e.g., a ballast gas). For instance, for earth atmospheric purposes, in one example the lift gas chamber is filled with a lighter-than-air gas such as hydrogen, helium or the like. Conversely the ballast chamber 126 of the dual chamber balloon 102 is filled with a heavier gas, such as air. As shown for instance in FIG. 2, in one example a controller 204 provided with the payload 104 of the high altitude balloon system 100 controls a source of lighter-than-air gas 200, for instance one or more tanks of lighter-than-air gas and accordingly supplies the lift gas chamber 124 with the lighter-than-air gas as needed (e.g., for supplementing if the gas gradually permeates the upper balloon panel 114). In a similar manner, the air ballast chamber 126 is supplied with air by way of an air ballast blower 202 also provided with the payload 104.

At 1108, the method 1100 further includes changing a lift gas chamber volume by changing a ballast chamber volume. As stated herein, the dual chamber balloon volume is maintained substantially constant throughout the operation of the high altitude balloon system 100 (for instance after the initial inflation). With changing of the volume of the air ballast chamber 126, for instance by way of operation of the air ballast blower 202, the volume of the air ballast chamber 126 is accordingly changed. That is to say, the deflectable diaphragm 118 is deflected upwardly or downwardly corresponding to increases or decreases of volume within the air ballast chamber 126. As the relative proportion of the air ballast chamber volume increases relative to the overall dual chamber balloon volume buoyancy of the dual chamber balloon 102 accordingly decreases. Conversely, as the air ballast chamber volume decreases the lift gas chamber volume correspondingly increases thereby increasing the buoyancy of the dual chamber balloon 102. In this way the dual chamber balloon 102 is able to selectively descend and ascend as desired by changing of the volume of the air ballast chamber 126 along with corresponding changes in the volume of the lift gas chamber 124 according to deflection of the diaphragm 118.

Several options for the m hod 1100 follow. In one example, inflating the dual chamber balloon 102 includes inflating the balloon within a launch chamber 910 of a remote launch system, such as the system 900 shown in FIG. 9. In another example, the launch chamber 910 includes an anti-static charge (and combustion minimizing) system, for instance a reservoir of inert gas or an anti-static medium 914 coupled with a distribution mechanism such as a fan 918. The anti-static medium or inert gas is delivered through an inert gas inlet 916 (e.g., a fan, blower, atomizer or the like) into the launch chamber 910 to accordingly reduce one or more of static electricity and the likelihood of combustion within the launch chamber and along the dual chamber balloon 102 as it is inflating within the launch chamber 910.

In another example, inflating of the dual chamber balloon 102 further includes retaining a plurality of tendons 122 in a distributed arrangement around the dual chamber balloon 102. Referring again to FIG. 1 the plurality of tendons 122 are shown in a distributed fashion for instance retained along the circumferential edge 120. That is to say, the circumferential edge 120 in one example includes a circumferential retaining feature 400 including a plurality of retaining orifices 402 therein sized and shaped to receive one or more of the tendons 122. The circumferential edge 120 accordingly retains the plurality of tendons 122 in a distributed fashion around the dual balloon chamber 102.

In another example the method 1100 further includes controlling a heading of the dual chamber balloon 102 (e.g., the high altitude balloon system 100) with a propulsion system 106 coupled with the dual chamber balloon 102. As shown in FIG. 1 and further shown in FIG. 6 the dual chamber balloon 106 in one example includes two or more propellers 600 provided in a spaced apart fashion (e.g., by one or more propeller arms 608). In one example, the propellers 600 cooperate to provide a torque to the dual chamber balloon 102 to accordingly rotate the high altitude balloon system 100 for instance where the propellers 600 are rotated at varying speeds relative to one another or where one of the propellers is reversed with regard to its rotation relative to the other of the propellers. As the high altitude balloon system 100 is turned onto a desired heading the propellers 600 are in one example operated in concert to accordingly propel the high altitude balloon system 100 along the desired direction. As further described herein, in another example, the method 1100 adjusts a center of gravity of the high altitude balloon system 100 to accordingly control the pitch of the system 100 as thrust is applied. Optionally, the center of gravity is controlled with the power source 604 or a weight translated along a central beam 606 of the gondola 107.

In another example, changing the lift gas chamber volume of the lift gas chamber 124 includes in one example inflating the ballast chamber 126 and increasing the ballast chamber volume to accordingly decrease the lift gas chamber volume. Deflating the air ballast chamber accordingly decreases the ballast chamber volume to increase the lift gas chamber volume of the lift gas chamber 124. With the increase of the ballast chamber volume the dual chamber balloon 102 as described herein becomes less buoyant and accordingly descends. Conversely, with decreasing of the ballast chamber volume and corresponding increase of the lift gas chamber volume the dual chamber balloon 102 becomes more buoyant and accordingly ascends. In still another example, inflation and deflation of the ballast chamber 126 are used to maintain the dual chamber balloon 102 at a static elevation for instance in response to pressure changes within the atmosphere. In still another example, inflating or deflating the ballast chamber 126 includes maintaining the dual chamber balloon volume constant while the lift gas chamber volume and the ballast chamber volume inversely change within the dual chamber balloon. The lift gas chamber volume and the ballast chamber volume together substantially equal the dual chamber balloon volume as previously described herein. That is to say, the dual chamber balloon volume is maintained at a substantially constant level after inflation of the dual chamber balloon 102 and it is through deflection of the deflectable diaphragm 118 with corresponding increasing and decreasing of the ballast chamber 126 that the buoyancy of the dual chamber balloon 102 is respectively decreased and increased (e.g., with corresponding changes to the volume of the lift gas chamber 124).

Optionally, inflating the ballast chamber and increasing the ballast chamber volume to decrease the lift gas chamber volume includes descent of the high altitude balloon system 100 to a first altitude wherein at the first altitude a first wind vector is found. The dual chamber balloon 102 for instance the high altitude balloon system 100 follows the first wind vector. In another example, deflating the ballast chamber and decreasing the ballast chamber volume to accordingly increase the lift gas chamber volume includes ascent of the high altitude balloon system 100 to a second altitude where the second altitude includes a second wind vector different from the first wind vector. The high altitude balloon system 100 follows the second wind vector at that higher altitude. Accordingly, in another example the method 1100 further includes directing and controlling movement of the high altitude balloon system through selective inflation and deflation of the ballast chamber 126 and corresponding changes in the lift gas chamber volume. By ascending or descending to various altitudes the high altitude balloon system 100 may accordingly be moved in one or more directions according to the wind vectors at each of those altitudes.

In still another example, changing the lift gas chamber volume by changing the ballast chamber volume includes deflecting the deflectable diaphragm 118 toward one of the upper apex 110 or the lower apex 112 (see FIG. 1) while a deflectable diaphragm perimeter is coupled along the circumferential edge. That is to say, as previously described herein the deflectable diaphragm is a panel of material in one example extending across the dual chamber balloon 102 for instance along the circumferential edge 120. Accordingly, the deflectable diaphragm 118 is configured to deflect upwardly and downwardly in contrast to an inner or nested balloon that inflates while inside a larger balloon.

In still another example, the method 1100 includes opening a pressure control valve 206 shown in FIG. 2 coupled with one or more of the lift gas chamber 124 or the ballast chamber 126. In one example, opening the pressure control valve 206 includes passively opening the pressure control valve automatically when the pressure in one of the lift gas chamber 124 or the ballast chamber 126 approaches or is above a threshold pressure (e.g., a pressure corresponding to a threshold skin stress of the balloon 102). That is to say, the pressure control valve 206 operates to decrease the pressure within the dual chamber balloon 102 to accordingly decrease skin stress for instance along the dual chamber balloon 102 (e.g., along the balloon outer surface 121). In another example opening the pressure control valve 206 includes remotely opening the pressure control valve, for instance by way of the controller 204 shown in FIG. 2. The pressure control valve 206 is in one example operated to accordingly adjust a pressure within the balloon by way of the controller 204 as opposed to an automatic mechanism such as a sensor directly coupled with the pressure control valve 206.

Figure 12:
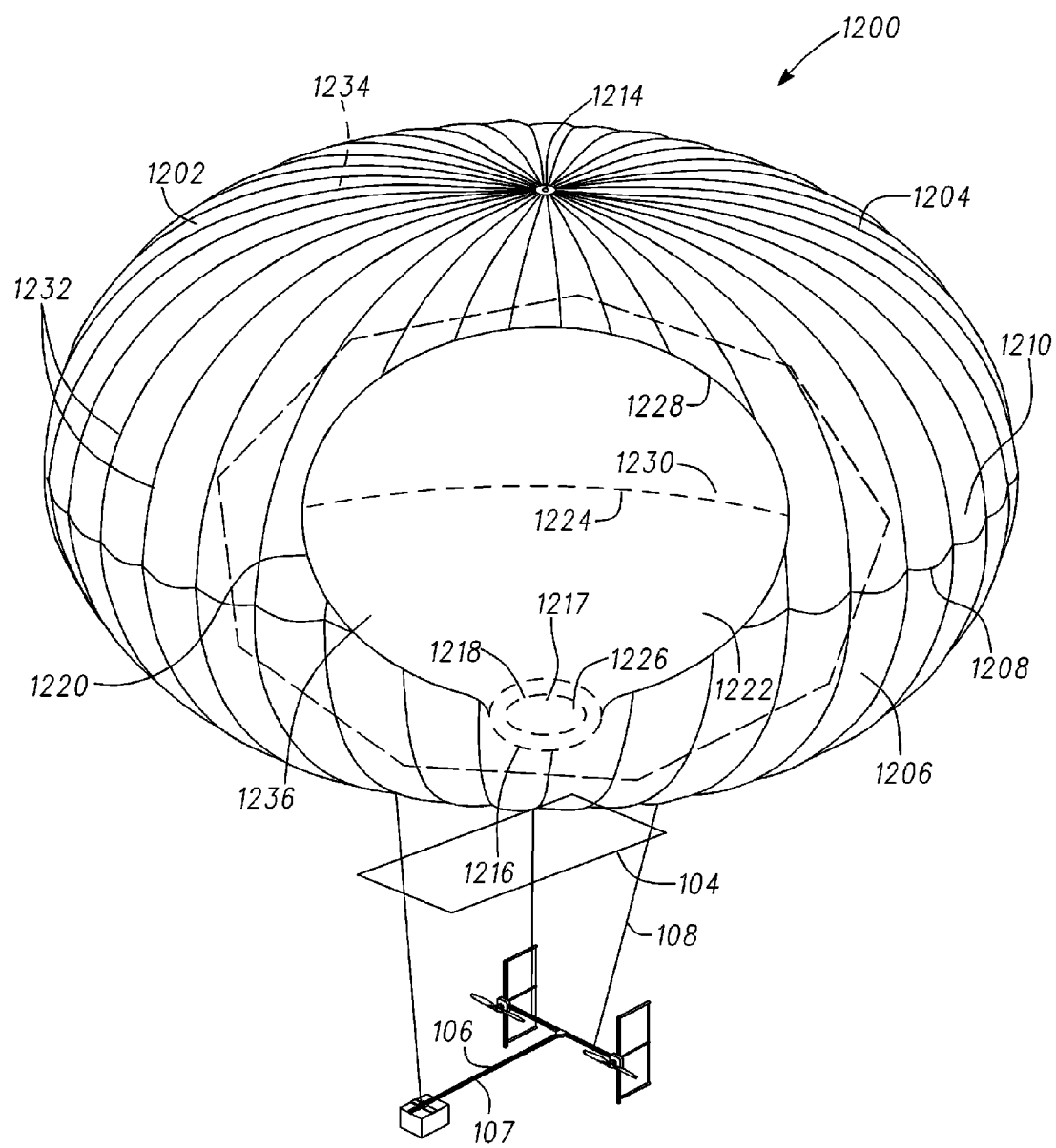
FIG. 12 is a partial sectional view of one example of an atmospheric balloon including a ballonet having upper and lower ballonet panels.

FIG. 12 shows another example of an atmospheric balloon system 1200 including an atmospheric balloon 1202. In the example shown in FIG. 12, the atmospheric balloon 1202 includes upper and lower balloon panels 1204, 1206 coupled along a circumferential edge 1208 (e.g., at the balloon equator or somewhere between the balloon upper and lower apexes, for instance closer to one of the apexes). The upper balloon panel 1204 extends from an upper apex 1214 to an upper panel edge 1210 and is coupled with a corresponding lower panel edge 1212 of the lower balloon panel 1206. Optionally, the upper and lower balloon panels 1204, 1206 are unitary panels (e.g., a single sheet or membrane). In another example, the panels 1204, 1206 include one or more subpanels that are assembled to form the panels 1204, 1206 either before or during assembly of the balloon 1202.

As further shown in FIG. 12, the lower balloon panel 1206 extends from the lower panel edge 1212 to a lower apex 1216. As shown in the example, the lower apex 1216 includes a lower apex fitting 1218. The lower apex fitting 1218 provides an interface between the atmospheric balloon 1202 and the ballonet 1220 (and optionally one or more of a blower, pressurized gas vessels or the like). As further shown in FIG. 12, the lower apex 1216 includes a lower apex opening 1217 extending through the balloon for instance through the lower balloon panel 1206.

The ballonet 1220 of the atmospheric balloon 1202 is constructed in a similar manner to the atmospheric balloon 1202. For instance, the ballonet 1220 includes an upper ballonet panel 1228 coupled with a lower ballonet panel 1222. As shown, each of the upper and lower ballonet panels 1228 include corresponding upper and lower perimeter edges 1230, 1224. With the upper ballonet panel 1228 coupled with the lower ballonet panel 1222 a ballast chamber 1236 is formed within the atmospheric balloon 1202. Conversely, a lift gas chamber 1234 is formed between the material of the atmospheric balloon 1202 (e.g., the upper and lower balloon panels 1204, 1206) and the ballonet 1220 including for instance the upper and lower ballonet panels 1228, 1222. As further shown in FIG. 12, the ballonet 1220 includes a ballonet orifice 1226 in communication with the lower apex opening 1217. In one example, the ballonet orifice 1226, the lower apex opening 1217 and the lower apex fitting 1218 are aligned (e.g., coincident). In another example, the lower apex fitting 1218 couples together each of the atmospheric balloon 1202 (the lower balloon panel 1206) and the ballonet 1220 (the lower ballonet panel 1222) at the corresponding lower apex opening 1217 and the ballonet orifice 1226. As will be described herein, in one example one or more ports are provided through the lower apex fitting 1218 to allow for ballast gas movement (including filling and evacuation of the ballast chamber 1236).

The ballonet 1220 described herein is in one example constructed with the upper and lower ballonet panels 1228, 1222 coupled together along their respective upper and lower perimeter edges 1230, 1224. For instance, the upper ballonet panel 1228 is in one example constructed with a circular or ovular panel overlaid over top of a corresponding ovular or circular lower ballonet panel 1222. The upper and lower perimeter edges 1230, 1224 are then readily joined for instance by way of one or more stitching, heat sealing, adhering or the like conducted on an assembly table. After construction of the ballonet 1220, the ballonet is in one example delivered into the atmospheric balloon 1202 for instance into the lift gas chamber 1234 and is thereafter coupled with the lower apex 1216 of the lower balloon panel 1206 for instance with the lower apex fitting 1218 (previously or later coupled with the ballonet 1220). One example of the lower apex fitting 1218 is described further herein. In another example, the upper and lower ballonet panels 1228, 1222 are constructed with one or more subpanels for instance half or quarter panels that are assembled to accordingly form the upper and lower ballonet panels 1228, 1222 (in the manner of composite panels). Optionally, the composite upper and lower ballonet panels 1228, 1222 are joined along their respective upper and lower perimeter edges 1230, 1224 as described herein.

Referring again to FIG. 12, the atmospheric balloon system 1200 in another example includes other features previously described herein. For instance, the atmospheric balloon 1202 includes a plurality of tendons 1232 extending from an upper apex 1214 to the lower apex 1216. In one example, the upper apex 1214 includes a fitting in a similar regard to the lower apex fitting 1218. Optionally, the tendons 1232 are coupled with the upper and lower apex fittings to anchor the tendons 1232 at desired locations near the top and bottom of the atmospheric balloon 1202. In another example, the tendons 1232 extend through a portion of the circumferential edge 1208 as previously described herein. Accordingly, the tendons 1232 are held at the locations for instance specified staggered locations around the atmospheric balloon 1202 as shown in FIG. 12 to ensure maintenance of the shape of the atmospheric balloon 1202 (e.g., a lobed pumpkin shape).

As further shown, the atmospheric balloon system 1200 in another example includes a payload 104 coupled by one or more suspension lines 108 to the atmospheric balloon 1202. As further shown, in another option the atmospheric balloon system 1200 includes a proportion system 106 coupled with a gondola 107 below the payload 104.

Referring again to the payload 104, in one example the payload 104 includes one or more of instruments, controllers, communication and broadcast equipment or the like configured to provide additional functionality to the atmospheric balloon system 1200 for instance to facilitate the observation of one or more locations, communications, broadcast of signals (e.g., wireless signals), internet based signal or the like to an area proximate the atmospheric balloon system 1200. In one example, the atmospheric balloon system 1200 is configured to broadcast internet access to locations within a broadcast zone provided by communication and broadcast equipment with the payload 104. In another example, the atmospheric balloon system 1200 is one of a network of balloons in the atmosphere to provide blanketed coverage of communication and broadcasting (e.g., internet broadcasting) to a region.

In another example, and as previously described, the payload 104 includes one or more of pressurized gas tanks, blowers or the like configured to provide ballast gas to the ballast chamber 1236. In one example, one or more blowers are provided with the payload 104 and M communication with the ballonet 1220 through the lower apex fitting 1218. The blower is operable, in one example, directionally to fill and evacuate the ballast chamber 1236 with ballast gases such as air. In another example, one or more pressurized gas tanks are provided with the payload 104 and in communication with the ballonet 1220 through the lower apex fitting 1218. Optionally, one or more valves are provided with the gas tanks and operated by a controller to accordingly introduce the ballast gas into the ballast chamber 1236. In another example, a blower or other gas evacuation device is provided in communication with the ballonet 1220 to evacuate ballast gas from ballast chamber 1236 while gas tanks provide the inflow of ballast gas.

Figure 13A:
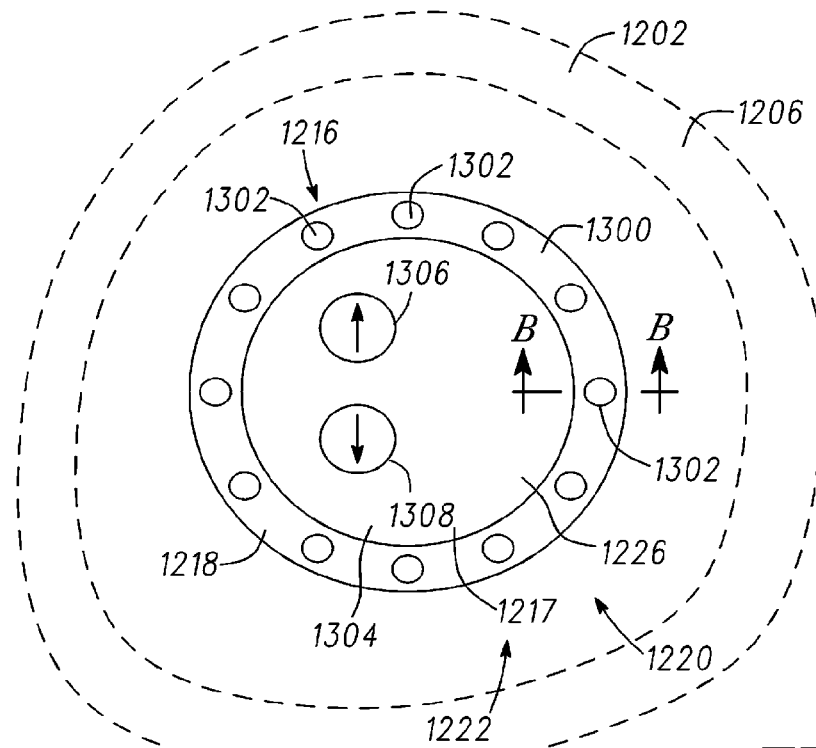
FIG. 13 is a top view of a lower ballonet panel coupled with a lower apex fitting.

FIG. 13A shows a top view of a lower apex fitting 1218 coupled with each of the ballonet 1220 and the atmospheric balloon 1202. The atmospheric balloon 1202 and the ballonet 1220 are shown in partial section for instance with the broken lines provided in the figure. As previously described herein, in one example the lower ballonet panel 1222 of the balloon 1220 is coupled with the lower balloon panel 1206 of the atmospheric balloon 1202 at the lower apex 1216 of the atmospheric balloon 1202. As shown, the lower ballonet panel 1222 is coupled with the lower apex fitting 1218 and similarly the lower balloon panel 1206 is coupled with the lower apex fitting 1218. In one example corresponding balloon and ballonet lips for each of the atmospheric balloon 1202 and the lower ballonet panel 1222 are coupled at the lower apex fitting 1218 for instance with one or more clamping ring. One example of a clamping ring such as a first clamping 1300 is shown in the top view of FIG. 13A.

As further shown in FIG. 13A, openings of each of the atmospheric balloon 1202 and the ballonet 1220 are in one example aligned with one another and similarly aligned with an opening within the lower apex fitting 1218. For instance, the lower apex opening 1217 and the ballonet orifice 1226 of the corresponding atmospheric balloon 1202 and the lower balloon panel 1206 are shown aligned with the lower apex fitting 1218 (e.g., coincident).

Referring again to FIG. 13A, the lower apex fitting 1218 is shown in a coupled configuration with each of the lower balloon panel 1206 and the lower ballonet panel 1222. As shown, the lower apex fitting 1218 includes one or more clamping rings such as the first clamping ring 1300 extending around the lower apex opening 1217 and providing an interface with the lower ballonet panel 1222 including a ballonet lip extending around the ballonet orifice 1226. In one example, a plurality of clamping rings 1300 are provided and clamp around each of the corresponding lips of the lower balloon panel 1206 and the lower ballonet panel 1222 to accordingly provide a clamping interface therebetween to couple and affix the lower balloon panel 1206 and the lower ballonet panel 1222 together at the lower apex fitting 1218. In one example, one or more fitting fasteners 1302 extend through the one or more clamping rings 1300 to fasten the clamping rings together and hold the lower ballonet panel 1222 and lower balloon panel 1206 interposed between the clamping rings. In one example, the fitting fasteners 1302 include but are not limited to bolts, screws or the like configured to draw each of the clamping rings 1300 together and thereby clamp each or one or more of the atmospheric balloon 1202 or ballonet 1220 therebetween. In the example shown in FIG. 13A, bolts are provided as the fitting fasteners 1302. In another example, one or more of mechanical clamps, adhesives or the like are provided with the clamping rings 1300 (and 1314 in FIG. 13B) to thereby hold the lower balloon panel 1206 and lower ballonet panel 1222 therebetween.

Figure 13B:
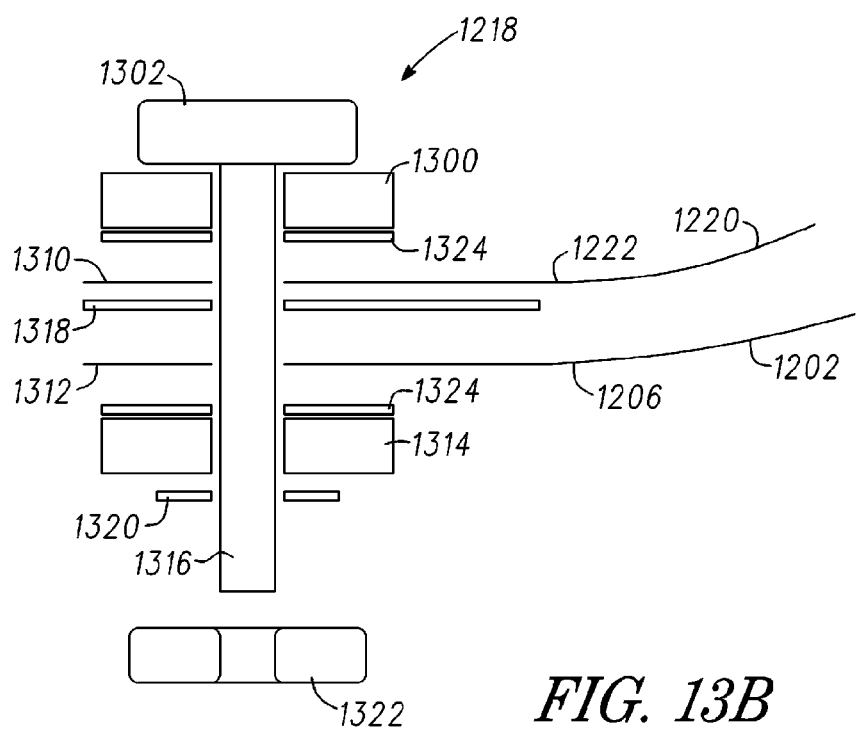

In yet another example, one or more of the lower balloon panel 1206 or the lower ballonet panel 1222 is held between two clamping rings such as a first clamping ring 1300 as shown in FIG. 13A and a supplemental clamping ring such as the second clamping ring 1314 shown in FIG. 13B. In such an example, the lower ballonet panel 1222 is in one example retained between the first and second clamping rings (including the clamping ring 1300 shown in FIG. 13A) to thereby couple the ballonet 1220 to the lower apex fitting 1218. Installing the lower ballonet panel 1222 in this manner allows for later installation of the lower apex fitting 1218 and the ballonet 1220 (in an intermediate configuration) in the atmospheric balloon 1202, such as through the lower apex opening 1217 of the lower balloon panel 1206. Optionally, a supplemental clamping ring, for instance a third clamping ring, is provided and the balloon lip of the balloon (formed in the lower balloon panel 1206) is interposed and clamped between the second and third clamping rings to provide an interface between the lower apex fitting 1218 and the atmospheric balloon 1202. The clamping engagement (or engagements) described herein provide a tight robust seal for the lower apex fitting 1218 with both the atmospheric balloon 1202 and the ballonet 1220.

As further shown, the lower apex fitting 1218 in one example includes a fitting panel 1304 spanning the lower apex fitting 1218 for instance across the first clamping ring 1300. As shown, the fitting panel 1304 in one example provides one or more ports such as the fill port 1306 and the evacuation port 1308. In another example, the fill port 1306 includes a unidirectional valve configured to allow for the inflow of gases into the ballonet 1220. Conversely, the evacuation port 1308 includes a unidirectional valve (e.g., a check valve) configured to allow for the evacuation of gases from the ballonet 1220. The fill and evacuation ports 1306, 1308 are selectively coupled with one or more features of the payload 104 including pressurized gas tanks, blowers or the like. Selective operation of one or more blowers or gas tanks accordingly allows for the filling or evacuation of the ballonet 1220 through the corresponding fill ports 1306, 1308. In another example, the lower apex fitting 1218 includes a single opening, for instance a bidirectional opening that allows for the operation of a feature such as a blower to move ballast gas into the ballast chamber 1236 (shown in FIG. 12) of the ballonet 1220 and thereafter evacuate the ballast gas from the ballast chamber 1236 for instance through the same opening.

FIG. 13B shows a cross-sectional detail of a portion of the lower apex fitting 1218 previously shown and described with regard to FIG. 13A. The sectional view shown in FIG. 13B is taken along sectional line B-B shown in FIG. 13A. Referring now to FIG. 13B, portions of each of the atmospheric balloon 1202 and the ballonet 1220 are shown. For instance the lower ballonet panel 1222 extending to a ballonet lip 1310 is shown and a lower balloon panel 1206 extending to a corresponding balloon lip 1312 as also shown. Each of the lower ballonet panel 1222 and the lower balloon panel 1206 includes the corresponding ballonet lip 1310 and balloon lip 131 extending around the respective openings, for instance the ballonet orifice 1226 and the lower apex opening 1217 previously shown in FIG. 13A. Each of the lower ballonet panel 1222 and lower balloon panel 1206 are shown in combination with the lower apex fitting 1218 in a partially exploded view in FIG. 13B to reveal further detail of the coupling of the lower apex fitting 1218 with each of these components.

As shown the ballonet lip 1310 is in one example coupled with a ring for instance a flush ring 1318 (e.g., a continuous flat ring) extending around the ballonet lip 1310. In one example the flush ring 1318 provides a support feature configured to fixedly receive the ballonet lip 1310 thereon. The ballonet lip 1310 is spread along the flush ring 1318 to minimize (e.g., entirely eliminate or minimize) wrinkles, folds, gathering or the like of the ballonet lip 1310 prior to clamping between the first and second clamping rings 1300, 1314. The flush ring 1318 in combination with the ballonet lip 1310 provides a substantially planar continuous surface for continuous surface to surface clamping between the first and second clamping rings 1300, 1314 and the ballonet 1220. Accordingly, gaps, folds or the like between the lower ballonet panel 1222 and the lower apex fitting 1218 are substantially minimized. A robust and reliable seal is thereby created to ensure the resulting ballast chamber 1236 formed by the ballonet 1220 and closed by the lower apex fitting 1218 remains sealed and provides a gas tight or near gas tight reservoir for the ballast gas therein.

In another example, the flush ring 1318 is provided as a separate component from the ballonet lip 1310. In one example, the ballonet lip 1310 is spread across the flush ring 1318. The fastener body 1316 of each of the fitting fasteners 1302 is delivery through each of the ballonet lip 1310 and the flush ring 1318. The ballonet lip 1310 is held between the first clamping ring 1300 and the flush ring 1318 in an intermediate configuration, for instance for eventual delivery of the assembled ballonet 1220 and lower apex fitting 1218 into the atmospheric balloon 1202. This facilitates further installation or coupling between the atmospheric balloon 1202 and the remainder of the lower apex fitting 1218. In one example, the flush ring 1318 includes a material configured to provide a rigid or semi-rigid support to the ballonet lip 1310 and thereby substantially prevent (e.g., minimize or eliminate) folds, gaps, wrinkles or the like along the ballonet lip 1310 prior to clamping between the first and second clamping rings 1300, 1314. In another example, the flush ring includes another layer of the ballonet 1220 material (e.g., of the lower ballonet panel 1222) that provides a cuff or collar feature when layered with the ballonet lip 1310. Optionally, the flush ring 1318 is deformable in a manner so that reception of the fastener body 1316 for instance within corresponding orifices of the flush ring 1318 allows for grasping of the flush ring 1318 around the fastener body 1316 to hold the lower apex fitting 1218 and the ballonet 1220 in an intermediate assembled configuration for delivery into the atmospheric balloon 1202 for instance through the lower apex opening 1217. The lower apex fitting 1218 and the ballonet 1220 are thereby prepared for coupling with the lower balloon panel 1206.

Referring again to FIG. 13B, the lower apex fitting 1218 includes the first and second clamping rings 1300, 1314. Referring to FIG. 13A, the first and second clamping rings 1300, 1314 in one example have a planar ring configuration that extends around each of the lower apex opening 1217 and the ballonet orifice 1226. The optional fitting panel 1304 is in one example an integral component to either of the first and second clamping rings 1300, 1314 or a separate component coupled for instance with the fitting fastener 1302 to the remainder of the lower apex fitting 1218 including (between) the first and second clamping rings 1300, 1314. The first and second clamping rings 1300, 1314 in the example shown in FIG. 13B extend around (including above and below each of the ballonet lip 1310 and the balloon lip 1312. Accordingly, each of the ballonet lip 1310 and the balloon lip 1312 are held between the first and second clamping rings 1300, 1314 as well as one or more gaskets 1324 provided with or in addition to the first and second clamping rings 1300, 1314. As further shown in FIG. 13B, where the flush ring 1318 is provided with the ballonet lip 1310 (or is a separate component coupled along the ballonet lip 1310) the flush ring 1318 is also included between the first and second clamping rings 1300, 1314.

When assembly of the lower apex fitting 1218 into a final configuration is desired the fitting fastener 1302 is used to fasten each of the first and second clamping rings 1300, 1314 together with each of the ballonet lip 1310 and balloon lip 1312 therebetween. As previously described herein the flush ring 1318 such as a continuous flat ring is provided with the ballonet lip 1310 to minimize (e.g., entirely prevent or minimize) folding, gathering, gaps or the like provided by uneven distribution of the ballonet lip 1310 around the lower apex fitting 1218. The fitting fastener 1302 is in one example tightened for instance with a nut 1322 to bias the first and second clamping rings 1300, 1314 toward each other. The ballonet lip 1310 and balloon lip 1312 (as well as the optional flush ring 1318) are clamped between the first and second clamping rings 1300, 1314 to provide a robust sealed configuration for each of the ballonet 1220 and the atmospheric balloon 1202 at the lower apex corresponding to the lower apex fitting 1218. As shown in FIG. 13B, in one example each of the first and second clamping rings 1300, 1314 includes gaskets 1324 configured to further enhance the clamping engagement with each of the ballonet lip 1310 and the balloon lip 1312 and thereby provide an enhancement to the seal between the lower apex fitting 1218 and each of the ballonet 1220 and the balloon 1202.

In another example, the lower apex fitting 1218 includes a supplemental (third) clamping ring, for instance a clamping ring provided between the nut 1322 and the second clamping ring 1314. In such an example, the lower balloon panel 1206 is provided between the second and third clamping rings (including the second clamping ring 1314) and is clamped therebetween in a similar manner to the ballonet lip 1310 coupled between the first and second clamping rings 1300, 1314. In such an example, the lower apex fitting 1218 is assembled in one example into an intermediate configuration with the ballonet lip 1310 as well as the optional flush ring 1318 provided between the first and second clamping rings 1300, 1314. The ballonet 1220 and the lower apex fitting 1218 is then installed through the lower apex opening 1217 of the atmospheric balloon 1202. The balloon lip 1312 is interposed between the second clamping ring 1314 and the supplemental third clamping ring. The fitting fastener 1302 including for instance a nut 1322 is tightened to clamp the balloon lip 1312 therebetween. As further shown in FIG. 13, in an example one or more washers 1320 are provided between the nut 1322 and one or more components of the lower apex fitting 1218 including for instance the second clamping ring 1314 (and in the example with the third clamping ring between the third clamping ring and the nut 1322).

Figure 14:
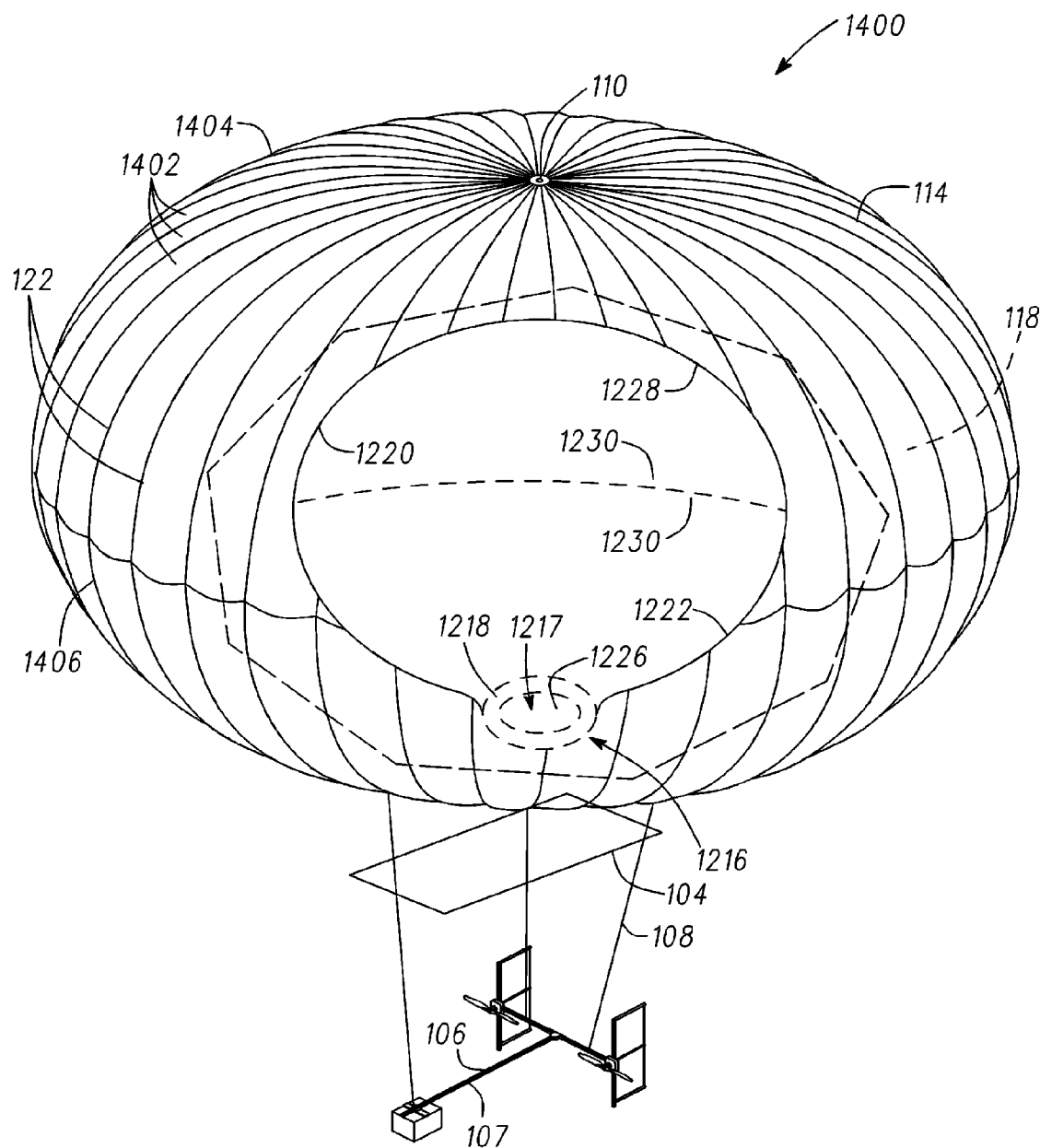
FIG. 14 is a perspective view of another example of an atmospheric balloon including a ballonet having upper and lower ballonet panels.

FIG. 14 shows another example of atmospheric balloon system 1400. As shown, the atmospheric balloon system 1400 is similar in regards to the other balloon examples described herein. The atmospheric balloon system 1400 includes an atmospheric balloon 1404 and a ballonet 1220 located within the atmospheric balloon. In contrast to the atmospheric balloon 1202 shown for instance in FIG. 12, the atmospheric balloon 1404 includes a gore construction including a plurality of gores 1402. As shown in FIG. 14, the gores 1402 extend from the upper apex 1214 to the lower apex 1216 of the atmospheric balloon 1404. The gores 1402 in one example have a diamond configuration tapering from an equator 1406 of the balloon 1404 toward each of the upper and lower apexes 1214, 1216. The gores 1402 are assembled and coupled along their respective edges (e.g., lateral edges) to accordingly form the atmospheric balloon 1404. In a similar manner to the atmospheric balloon system 1200, in one example the system 1400 includes a payload 1404, suspension lines 108 and an optional propulsion system 106. The payload 104 includes one or more pieces of equipment including control systems, blowers, pressurized gas tanks, communication systems, instrumentation such as sensors, reception and broadcasting equipment for internet access or the like. Referring again to FIG. 14 the ballonet 1220 is shown coupled with the atmospheric balloon 1404. As previously described, the ballonet 1220 is constructed with an upper ballonet panel 1228 and a lower balloon panel 1222. The upper and lower ballonet panels 1228, 1222 are coupled along respective upper and lower perimeter edges 1230, 1224. In one example the upper and lower perimeter edges 1230, 1224 are coupled along an equator for instance a midpoint of the ballonet 1220. In other example one of the upper and lower ballonet panels 1228, 1222 is larger (has a larger circumference) than the other of the lower or upper ballonet panel 1222, 1228. Accordingly, the interface between the upper and lower ballonet panels 1228, 1222 is at a different position from the equator. For instance, where the upper ballonet panel 1228 is larger than the lower ballonet panel 1222 the interface between the upper and lower perimeter edges 1230, 1222 is at a lower position along the ballonet 1220, for instance closer to the lower apex fitting 1218.

As also described herein, in one example the upper ballonet panel 1228 is constructed with a different material than the lower ballonet panel 1222. For instance where a reflective characteristic is desired with the upper ballonet panel 1228, a reflective material is provided in the upper ballonet panel 1228 to accordingly minimize solar heating by way of light that penetrates the atmospheric balloon 1404 and falls on the upper ballonet panel 1228. In another example the upper ballonet panel 1228 is constructed with a darker or other solar receptive material configured to heat the ballonet and ballast gases with the reception of sunlight on the upper ballonet panel 1228 (e.g., transmitted through a translucent or transparent atmospheric balloon 1404).

As further shown in FIG. 14, the ballonet 1220 is coupled with the atmospheric balloon 1404, for instance at the lower apex 1216. In one example, the ballonet 1220 (as previously shown in FIG. 12) aligns the ballonet orifice 1226 with the corresponding lower apex opening 1217. The lower apex fitting 1218 couples the ballonet 1220 with the atmospheric balloon 1404. One example of the lower apex fitting 1218 is shown in FIGS. 13A, 13B.

Figure 15:
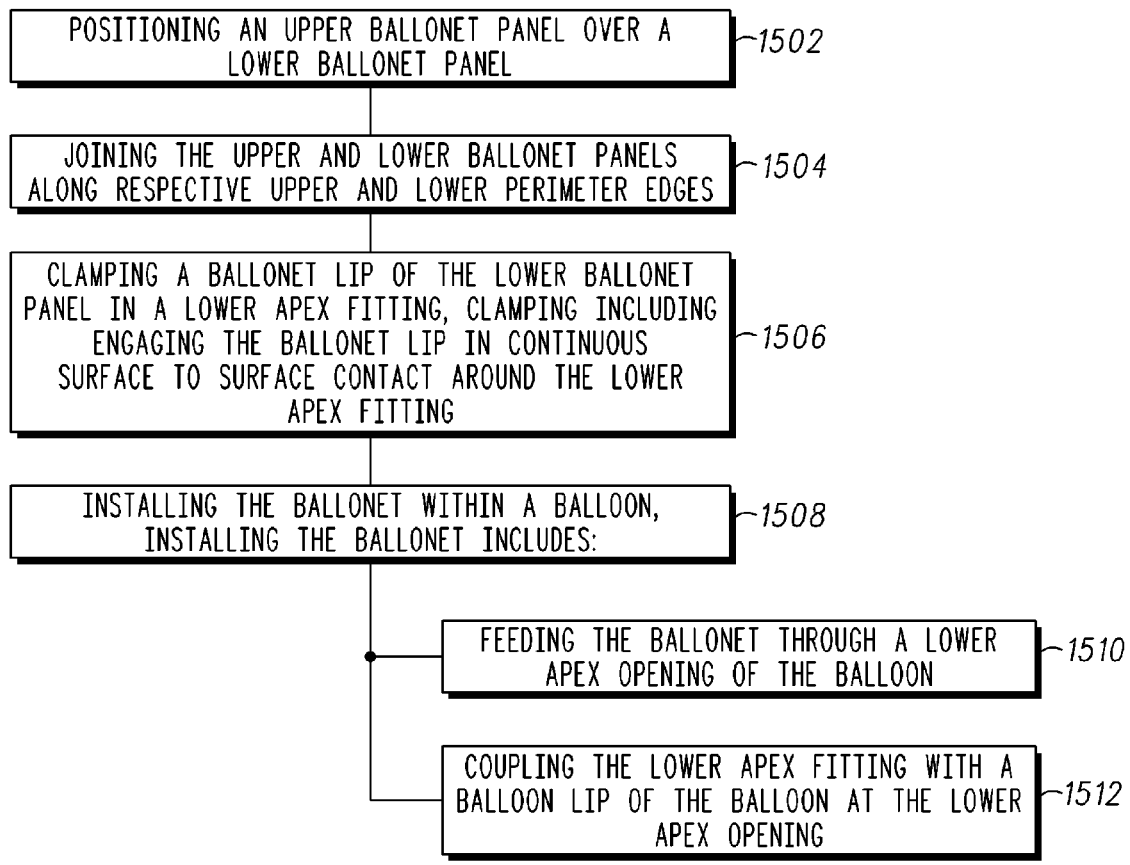
FIG. 15 is a block diagram showing one example of a method for assembling an atmospheric balloon system including a ballonet having upper and lower ballonet panels.

FIG. 15 shows one example of a method 1500 for assembling an atmospheric balloon system for instance one or more of the systems 1200, 1400 shown in FIGS. 12, 14. In describing the method 1500, reference is made to one or more components, features, functions, steps or the like described herein. Where convenient, reference is made to the components, features, steps, functions or the like with reference numerals. Reference numerals provided are exemplary and are not exclusive. For instance, the features, components, functions, steps or the like described in the method 1500 include, but are not limited to, the corresponding numbered elements, other corresponding features described herein (both numbered and unnumbered) as well as their equivalents.

At 1502 the method 1500 includes positioning an upper ballonet panel 1228 over a lower ballonet panel 1206. As previously described herein, in one example (hu upper and lower ballonet panels 1228, 1206 are unitary panels that are coupled along their respective upper and lower perimeter edges, in another example, the upper and lower ballonet panels 1228, 1206 are instead formed from one or subpanels for instance quarter or half panels. The subpanels are assembled together for instance by way of one or more stitching, heat sealing, adhesives or the like to form the upper and lower ballonet panels 1228, 1206.

At 1504 the upper and lower ballonet panels 1228, 1206 are joined along respective upper and lower perimeter edges 1230, 1224. Joining of the upper and lower ballonet panels 1228, 1206 includes, but is not limited to, one or more of heat sealing, stitching, adhering or the like of the upper and lower perimeter edges 1230, 1224 together. As previously described herein, the upper and lower perimeter edges 1230, 1224 are in one example coupled along an equator, for instance at an equal distance from each of the upper and lower apexes of the ballonet 1220. In another example, the upper and lower perimeter edges 1230, 1224 are coupled together at positions nearer to one or more of the lower apex or the upper apex of the ballonet 1220.

At 1506 a ballonet lip, for instance the ballonet lip 1310 shown in FIG. 13B, is clamped in the lower apex fitting 1218. Clamping in one example includes engaging the ballonet lip 1310 in continuous surface to surface contact around the lower apex fitting 1218. That is to say, one or more of pleats, wrinkles, gaps or the like formed by gathering of the ballonet lip 1310 are minimized (e.g., eliminated or greatly minimized). Accordingly, the lower apex fitting 1218 as described herein provides a robust seal between the fitting 1218 and the ballonet 1220 to thereby ensure a gas tight or near gas tight seal therebetween. As previously described herein, in one example first and second clamping rings 1300, 1314 are in one example engaged with the ballonet lip 1310 in clamping engagement to form the interface between the ballonet 1220 (e.g., the lower ballonet panel 1222) and the lower apex fitting 1218.

In still another example, a flush ring 1318, for instance a continuous flat ring, is coupled along the ballonet lip 1310 and provides a flat supportive structure to the ballonet lip 1310 that minimizes (e.g., eliminates or minimizes) bunching, folding or the like of the ballonet lip 1310 prior to engagement between the first and second clamping rings 1300, 1314. The flush ring 1318 includes, but is not limited to, a rigid (e.g., rigid or semi-rigid) supporting material coupled with the ballonet lip 1310. In another example, the flush ring 138 includes a flexible material, for instance another layer of the ballonet 1220 material or the like applied over the ballonet material at the ballonet lip 1310 to form a planar cuff or collar. The ballonet lip 1310 is spread across the flush ring 1318 to remove folds, creases, gaps or the like in the ballonet lip 1310 prior to engagement between the first and second clamping rings 1300, 1314. Accordingly, when clamped between the first and second clamping rings 1300, 1314 the ballonet lip 1310 is provided in a spread planar configuration (e.g., planar) and is accordingly wrinkles, folds, gathering, gaps or the like are minimized.

At 1508 the method 1500 further includes installing the ballonet 1220 (for instance in an intermediate configuration coupled with the lower apex fitting 1218) within a balloon, such as the atmospheric balloon 1202 or the atmospheric balloon 1404 (shown in FIG. 14). Installing the ballonet 1220 includes, but is not limited to, at 1510 feeding the ballonet 1220 through the lower apex opening 1217 of the atmospheric balloon 1202 (or balloon 1404). At 1512 the lower apex fitting 1218 is coupled with the balloon lip 1312 (shown in FIG. 13B). As shown at FIGS. 13A, B, the balloon lip 1312 surrounds the lower apex opening 1217 and the ballonet 1220, coupled with the lower apex fitting 1218, is coupled with the balloon lip 1312 at the lower apex opening 1217 (with the fitting).

Several options for the method 1500 follow. As previously described herein, in one example positioning the upper ballonet panel 1230 over the lower ballonet panel 1222 includes positioning unitary upper and lower ballonet panels 1228, 1222 relative to one another. In another example, multicomponent ballonet panels 1228, 1222 are used (e.g., ballonet subpanels that are quarter or half panels that are assembled prior to overlaying of the upper ballonet panel over the lower ballonet panel). In another example, positioning of the upper ballonet panel 1228 over the lower ballonet panel 1222 includes positioning panels having differing materials, for instance one or more of solar reflective or solar receptive materials, in another example, joining the upper and lower ballonet panels 1228, 1222 includes one or more of adhering, stitching or heat sealing the upper and lower perimeter edges 1230, 1224.

In another example, the method 1500 includes clamping the ballonet lip 1310 shown in FIG. 13B between first and second clamping rings 1300, 1314 as previously described herein. Optionally clamping the ballonet lip 1310 includes spreading the ballonet lip 1310 continuously across the lower apex fitting 1218. One example of spreading of the ballonet lip 1310 is provided with the flush ring 1318. The ballonet lip 1310 is spread across the flush ring 1318 and is thereby provided in a spread substantially planar configuration without gathering, folds, creases or the like. Instead, the ballonet lip 1310 is interposed between the first and second clamping rings 1300, 1314 (e.g., along the fastener bodies 1316 of the fitting fasteners 1302) in a substantially planar configuration to allow for continuous surface to surface contact between the first and second clamping ring 1300 and the ballonet lip 1310. In another example, the method 1500 includes smoothing pleats and wrinkles in the ballonet 1220 at the ballonet lip 1310. As previously described herein, one example the flush ring 1318 is used to smooth the ballonet lip 1310 either by coupling the lip along flush ring (with adhesives) or by forming a collar or cuff (for instance with another layer of ballonet material). In another example, the ballonet lip 1310 is spread across one of the first or second clamping rings 1300, 1314 prior to clamping engagement between the first and second clamping rings.

In another example, the method 1500 further includes coupling a blower with the atmospheric balloon (e.g., with the ballonet 1220). The blower is in one example included with the payload 104 and communicates with the ballast chamber 1236 of the ballonet 1220 with one or more ports including but not limited to the fill port 1306 and the evacuation port 1308 shown in FIG. 13A. The fill port 1306 and the evacuation port 1308 are each examples of ballast fluid ports. In another example, a single ballast fluid port is provided (e.g., through the lower apex fitting 1218). Accordingly a blower, for instance a bidirectional blower, is able to move ballast gas into and out of the ballast chamber 1236 of the ballonet 1220 through a single port or multiple ports. In another example, the method 1500 includes coupling the one or more components with the atmospheric balloon 1202 including for instance, the payload 104, an optional propulsion system 106 or the like.

VARIOUS NOTES & EXAMPLES

Example 1 can include a high altitude balloon system comprising: a dual chamber balloon, the dual chamber balloon extending from an upper apex to a lower apex with a circumferential edge between the upper and lower apexes; and a deflectable diaphragm within the dual chamber balloon and coupled along the circumferential edge, the deflectable membrane divides the dual chamber balloon into: a lift gas chamber formed by an interior surface of the dual chamber balloon and the deflectable diaphragm, and a ballast chamber formed by the interior surface of the dual chamber balloon and the deflectable diaphragm, the ballast chamber configured to change the buoyancy of the dual chamber balloon.

Example 2 can include, or can optionally be combined with the subject matter of Example 1, to optionally include wherein the dual chamber balloon includes: an upper pliable balloon panel having the upper apex, a lower pliable balloon panel having the lower apex, and the deflectable diaphragm is interposed between upper and lower pliable balloon panels, and wherein the upper and lower pliable balloon panels and the deflectable diaphragm are coupled along the circumferential edge to form the dual chamber balloon.

Example 3 can include, or can optionally be combined with the subject matter of one or any combination of Examples 1 or 2 to optionally an edge seal extending along the circumferential edge, and the edge seal seals each of the lift gas chamber and the ballast chamber.

Example 4 can include, or can optionally be combined with the subject matter of one or any combination of Examples 1 through 3 to optionally include wherein the deflectable diaphragm is a pliable diaphragm panel coupled between the upper and lower pliable balloon panels at the circumferential edge.

Example 5 can include, or can optionally be combined with the subject matter of one or any combination of Examples 1-4 to optionally include wherein the pliable diaphragm panel is the same size as the upper and lower pliable balloon panels.

Example 6 can include, or can optionally be combined with the subject matter of Examples 1-5 to optionally include wherein at least two or more of the upper and lower pliable balloon panels and the pliable diaphragm panel are constructed with different materials.

Example 7 can include, or can optionally be combined with the subject matter of Examples 1-6 to optionally include wherein the upper pliable balloon panel is configured as a space facing side of the dual chamber balloon and includes a heat reflective material, and the lower pliable balloon panel is configured as an earth facing side of the dual chamber balloon and includes a heat absorbent material, a heat reflectivity of the upper pliable balloon panel is greater than a heat reflectivity of the lower pliable balloon panel, and a heat absorbency of the lower pliable balloon panel is greater than a heat absorbency of the upper pliable balloon panel.

Example 8 can include, or can optionally be combined with the subject matter of Examples 1-7 to optionally include wherein a dual chamber balloon volume is constant, and a lift gas chamber volume and a ballast chamber volume are variable components of the dual chamber balloon volume.

Example 9 can include, or can optionally be combined with the subject matter of Examples 1-8 to optionally include wherein the ballast chamber volume is adjustable between 0 and 100 percent and the lift gas chamber volume is conversely adjustable between 0 and 100 percent of the dual chamber volume.

Example 10 can include, or can optionally be combined with the subject matter of Examples 1-9 to optionally include wherein the dual chamber balloon includes a balloon outer surface, and a plurality of tendons extend over the balloon outer surface from the upper apex to the lower apex.

Example 11 can include, or can optionally be combined with the subject matter of Examples 1-10 to optionally include wherein each of the plurality of tendons are coupled with a circumferential anchor at the circumferential edge, and the circumferential anchor retains the plurality of tendons in a distributed arrangement around the dual chamber balloon.

Example 12 can include, or can optionally be combined with the subject matter of Examples 1-11 to optionally include wherein the dual chamber balloon includes a laminated or coextruded film, the laminated or coextruded film including: at least one polyethylene layer, and an ethyl vinyl alcohol layer.

Example 13 can include, or can optionally be combined with the subject matter of Examples 1-12 to optionally include a source of lighter than air gas coupled with the lift gas chamber; and a controller with ascending, descending and static modes: in the static mode the controller coordinates a lift gas chamber volume and a ballast chamber volume to hold the high altitude balloon system at a static altitude, in the descending mode the controller increases the ballast chamber volume to decrease the lift gas chamber volume to lower the high altitude balloon system from the static altitude, and in the ascending mode the controller decreases the ballast chamber volume to increase the lift gas chamber volume to elevate the high altitude balloon system from the static altitude.

Example 14 can include, or can optionally be combined with the subject matter of Examples 1-13 to optionally include a deflation port in communication with the lift gas chamber, the deflation port including: a valve flapper rotatably coupled with a valve ring, a biasing mechanism configured to bias the valve flapper toward an open position, and a retaining feature configured to hold the valve flapper in a closed position, disengagement of the retaining feature allowing the biasing mechanism to move the valve flapper to the open position.

Example 15 can include, or can optionally be combined with the subject matter of Examples 1-14 to optionally include wherein the retaining feature includes a destructible link, a heating element, and a receiver configured to initiate destructible of the destructible link with the heating element upon reception of a deflation signal.

Example 16 can include, or can optionally be combined with the subject matter of Examples 1-15 to optionally include a propulsion system coupled with the dual chamber balloon, the propulsion system providing directional control of the dual chamber balloon.

Example 17 can include, or can optionally be combined with the subject matter of Examples 1-16 to optionally include wherein the propulsion system includes: a gondola coupled with the dual chamber balloon, and at least one propulsion unit coupled with the gondola and configured to control a heading of the balloon.

Example 18 can include, or can optionally be combined with the subject matter of Examples 1-17 to optionally include a remote launch system including: a launch chamber configured to hold the dual chamber balloon therein during at least a portion of inflation, and an anti-static charge system configured to minimize static electricity build up along the dual chamber balloon.

Example 19 can include, or can optionally be combined with the subject matter of Examples 1-18 to optionally include wherein the anti-static charge system includes an inert gas source and a gas distribution mechanism coupled with the launch chamber.

Example 20 can include, or can optionally be combined with the subject matter of Examples 1-19 to optionally include a method of making a high altitude balloon system comprising: interposing a deflectable diaphragm between an upper pliable balloon panel and a lower pliable balloon panel, the upper pliable balloon panel including an upper apex of a dual chamber balloon, and the lower pliable balloon including a lower apex of the dual chamber balloon; and forming the dual chamber balloon including: coupling the upper pliable balloon panel with the lower pliable balloon panel at a circumferential edge to form a balloon outer surface of the dual chamber balloon, coupling the diaphragm to the upper and lower pliable balloon panels at the circumferential edge to form a lift gas chamber and a ballast chamber, the ballast chamber separated from the lift gas chamber by the diaphragm, and wherein the lift gas chamber is formed by the upper pliable balloon panel and the diaphragm, and the ballast chamber is formed by the lower pliable balloon panel and the diaphragm.

Example 21 can include, or can optionally be combined with the subject matter of Examples 1-20 to optionally include wherein coupling the upper pliable balloon panel with the lower pliable balloon panel and coupling the diaphragm to the upper and lower pliable balloon panels occurs at the same time.

Example 22 can include, or can optionally be combined with the subject matter of Examples 1-21 to optionally include selecting a first material for the upper pliable balloon panel, and selecting a second material for the lower pliable balloon panel, the first material different from the second material.

Example 23 can include, or can optionally be combined with the subject matter of Examples 1-22 to optionally include wherein selecting the first material includes selecting a heat reflective material, a heat reflectivity of the first material greater than a heat reflectivity of the second material, and selecting the second material includes selecting a heat absorbent material, a heat absorbency of the second material greater than a heat reflectivity of the first material.

Example 24 can include, or can optionally be combined with the subject matter of Examples 1-23 to optionally include coextruding one or more of the upper or lower pliable balloon panels with a layer of ethyl vinyl alcohol.

Example 25 can include, or can optionally be combined with the subject matter of Examples 1-24 to optionally include wherein one or more of coupling the upper and lower pliable balloon panels at the circumferential edge and coupling the diaphragm to the upper and lower pliable balloon panels includes forming an edge seal along the circumferential edge, the edge seal seals each of the lift gas chamber and the ballast chamber.

Example 26 can include, or can optionally be combined with the subject matter of Examples 1-25 to optionally include coupling a plurality of tendons over a balloon outer surface of the dual chamber balloon, each of the plurality of tendons extending from near the upper apex to near the lower apex and crossing the circumferential edge.

Example 27 can include, or can optionally be combined with the subject matter of Examples 1-26 to optionally include wherein coupling the plurality of tendons includes retaining one or more of the plurality of tendons along the circumferential edge, and retaining maintains the plurality of tendons in a distributed arrangement around the dual chamber balloon.

Example 28 can include, or can optionally be combined with the subject matter of Examples 1-27 to optionally include wherein coupling the diaphragm to the upper and lower pliable balloon panels at the circumferential edge includes: forming the lift gas chamber having a lift gas chamber volume, forming the ballast chamber having a ballast chamber volume, and each of the lift gas chamber volume and the ballast chamber volume variably fill a dual balloon chamber volume of the dual chamber balloon.

Example 29 can include, or can optionally be combined with the subject matter of Examples 1-28 to optionally include coupling a deflation port with the dual chamber balloon adjacent to the lift gas chamber, the deflation portion including: a valve flapper rotatably coupled with a valve ring, a biasing mechanism configured to bias the valve flapper toward an open position, and a retaining feature configured to hold the valve flapper in a closed position, disengagement of the retaining feature allowing the biasing mechanism to move the valve flapper to the open position.

Example 30 can include, or can optionally be combined with the subject matter of Examples 1-29 to optionally include coupling a propulsion system with the dual chamber balloon, the propulsion system providing directional control of the dual chamber balloon.

Example 31 can include, or can optionally be combined with the subject matter of Examples 1-30 to optionally include wherein coupling the propulsion system includes coupling a gondola with the dual chamber balloon, and the gondola includes at least one propulsion unit configured to control a heading of the balloon.

Example 32 can include, or can optionally be combined with the subject matter of Examples 1-31 to optionally include installing the dual chamber balloon within a remote launch system, the remote launch system including: a launch chamber configured to hold the dual chamber balloon therein during at least a portion of inflation, and an anti-static charge system configured to minimize static electricity build up along the dual chamber balloon.

Example 33 can include, or can optionally be combined with the subject matter of Examples 1-32 to optionally include wherein installing the dual chamber balloon within the remote launch system includes coupling an inert gas source and a gas distribution mechanism with the launch chamber.

Example 34 can include, or can optionally be combined with the subject matter of Examples 1-33 to optionally include a method of using a high altitude balloon comprising: inflating a dual chamber balloon to a dual chamber balloon volume, the dual chamber balloon including a deflectable diaphragm coupled along a circumferential edge of the dual chamber balloon and between upper and lower apexes of the dual chamber balloon, inflating including: filling a lift gas chamber of the dual chamber balloon with a lighter gas, and filling a ballast chamber of the balloon with a heavier gas; and changing a lift gas chamber volume by changing a ballast chamber volume.

Example 35 can include, or can optionally be combined with the subject matter of Examples 1-34 to optionally include wherein inflating the dual chamber balloon includes inflating the dual chamber balloon within a launch chamber having an anti-static charge system.

Example 36 can include, or can optionally be combined with the subject matter of Examples 1-35 to optionally include wherein inflating the dual chamber balloon includes inflating the dual chamber balloon with hydrogen.

Example 37 can include, or can optionally be combined with the subject matter of Examples 1-36 to optionally include wherein inflating the dual chamber balloon includes filling the launch chamber with an inert gas.

Example 38 can include, or can optionally be combined with the subject matter of Examples 1-37 to optionally include wherein inflating the dual chamber balloon includes retaining a plurality of tendons in a distributed arrangement around the dual chamber balloon.

Example 39 can include, or can optionally be combined with the subject matter of Examples 1-38 to optionally include wherein retaining the plurality of tendons in the distributed arrangement includes retaining the plurality of tendons at the circumferential edge.

Example 40 can include, or can optionally be combined with the subject matter of Examples 1-39 to optionally include controlling a heading of the dual chamber balloon with a propulsion system coupled with the dual chamber balloon.

Example 41 can include, or can optionally be combined with the subject matter of Examples 1-40 to optionally include wherein changing the lift gas chamber volume includes: inflating the ballast chamber and increasing the ballast chamber volume to decrease the lift gas chamber volume, and deflating the air ballast chamber and decreasing the ballast chamber volume to increase the lift gas chamber volume.

Example 42 can include, or can optionally be combined with the subject matter of Examples 1-41 to optionally include wherein inflating the ballast chamber and increasing the ballast chamber volume to decrease the lift gas chamber volume includes descending to a first altitude having a first wind vector, the dual chamber balloon following the first wind vector, and deflating the ballast chamber and decreasing the ballast chamber volume to increase the lift gas chamber volume includes ascending to a second altitude having a second wind vector different from the first wind vector, the dual chamber balloon following the second wind vector.

Example 43 can include, or can optionally be combined with the subject matter of Examples 1-42 to optionally include wherein changing the lift gas chamber volume includes deflecting the deflectable diaphragm toward one of the upper apex or the lower apex while a deflectable diaphragm perimeter is coupled along the circumferential edge.

Example 44 can include, or can optionally be combined with the subject matter of Examples 1-43 to optionally include opening a pressure control valve coupled with one or more of the lift gas chamber or the ballast chamber.

Example 45 can include, or can optionally be combined with the subject matter of Examples 1-44 to optionally include wherein opening the pressure control valve includes passively opening the pressure control valve when a pressure in one of the lift gas chamber or the ballast chamber is above a threshold pressure.

Example 46 can include, or can optionally be combined with the subject matter of Examples 1-45 to optionally include wherein opening the pressure control valve includes remotely opening the pressure control valve.

Example 47 can include, or can optionally be combined with the subject matter of Examples 1-46 to optionally include wherein inflating or deflating the ballast chamber includes maintaining the dual chamber balloon volume constant while the lift gas chamber volume and the air ballast chamber volume inversely change within the dual chamber balloon, and the lift gas chamber volume and the ballast chamber volume together substantially equal the dual chamber balloon volume.

Example 48 can include, or can optionally be combined with the subject matter of Examples 1-47 to optionally include an atmospheric balloon system comprising: an atmospheric balloon having an upper balloon panel coupled with a lower balloon panel: the upper balloon panel includes an upper apex and an upper panel edge, and the lower balloon panel includes a lower panel edge, a balloon lip and a lower apex opening at the balloon lip, wherein the upper panel edge is coupled along the lower panel edge; a ballonet within the atmospheric balloon, the ballonet is coupled with the lower balloon panel at the lower apex opening, the ballonet includes: a lower ballonet panel having a lower perimeter edge and a ballonet orifice extending through the lower ballonet panel at a ballonet lip, an upper ballonet panel having an upper perimeter edge, wherein the upper perimeter edge is coupled along the lower perimeter edge; and a lower apex fitting coupling the ballonet lip with the balloon at the balloon lip of the lower apex opening.

Example 49 can include, or can optionally be combined with the subject matter of Examples 1-48 to optionally include wherein the ballonet lip is coupled along the lower apex fitting with continuous surface to surface contact between the ballonet lip and the lower apex fitting.

Example 50 can include, or can optionally be combined with the subject matter of Examples 1-49 to optionally include wherein the ballonet lip includes a continuous flat ring extending around the ballonet orifice.

Example 51 can include, or can optionally be combined with the subject matter of Examples 1-50 to optionally include wherein the lower apex fitting includes first and second clamping rings, and the continuous flat ring of the ballonet lip is coupled in continuous surface to surface contact with the first and second clamping rings.

Example 52 can include, or can optionally be combined with the subject matter of Examples 1-51 to optionally include wherein the upper and lower ballonet panels are coupled along the respective upper and lower perimeter edges at an equator of the ballonet.

Example 53 can include, or can optionally be combined with the subject matter of Examples 1-52 to optionally include wherein the lower apex fitting includes at least one ballast fluid port.

Example 54 can include, or can optionally be combined with the subject matter of Examples 1-53 to optionally include a blower in communication a ballonet cavity of the balloon through the at least one ballast fluid port.

Example 55 can include, or can optionally be combined with the subject matter of Examples 1-54 to optionally include wherein the upper ballonet panel includes different materials from the lower ballonet panel.

Example 56 can include, or can optionally be combined with the subject matter of Examples 1-55 to optionally include a payload coupled with the balloon.

Example 57 can include, or can optionally be combined with the subject matter of Examples 1-56 to optionally include wherein the upper and lower panel edges of the upper and lower balloon panels are coupled at an equator of the balloon.

Example 58 can include, or can optionally be combined with the subject matter of Examples 1-57 to optionally include wherein the upper and lower balloon panels and a ballonet exterior form a lift gas chamber, and a ballonet interior forms a ballast chamber.

Example 59 can include, or can optionally be combined with the subject matter of Examples 1-58 to optionally include an atmospheric balloon system comprising: a balloon having a balloon membrane extending between an upper apex and a lower apex opening, the lower apex opening extending through the balloon membrane at a balloon lip; a ballonet within the balloon, the ballonet is coupled with the balloon membrane at the lower apex opening, the ballonet includes: a lower ballonet panel having a lower perimeter edge and a ballonet orifice extending through the lower ballonet panel at a ballonet lip, an upper ballonet panel having an upper perimeter edge, wherein the upper and lower ballonet panels are coupled along the respective upper and lower perimeter edges; and a lower apex fitting coupling the ballonet lip with the balloon at the balloon lip of the lower apex opening.

Example 60 can include, or can optionally be combined with the subject matter of Examples 1-59 to optionally include wherein the ballonet lip is coupled along the lower apex fitting with continuous surface to surface contact between the ballonet lip and the lower apex fitting.

Example 61 can include, or can optionally be combined with the subject matter of Examples 1-60 to optionally include wherein the ballonet lip includes a continuous flat ring extending around the ballonet orifice.

Example 62 can include, or can optionally be combined with the subject matter of Examples 1-61 to optionally include wherein the lower apex fitting includes first and second clamping rings, and the continuous flat ring of the ballonet lip is coupled in continuous surface to surface contact with the first and second clamping rings.

Example 63 can include, or can optionally be combined with the subject matter of Examples 1-62 to optionally include wherein the upper and lower ballonet panels are coupled along the respective upper and lower perimeter edges at an equator of the ballonet.

Example 64 can include, or can optionally be combined with the subject matter of Examples 1-63 to optionally include wherein the upper and lower ballonet panels are coupled with an adhesive along the respective upper and lower perimeter edges.

Example 65 can include, or can optionally be combined with the subject matter of Examples 1-64 to optionally include wherein the upper and lower ballonet panels are coupled with a heat seal along the respective upper and lower perimeter edges.

Example 66 can include, or can optionally be combined with the subject matter of Examples 1-65 to optionally include wherein the lower apex fitting includes at least one ballast fluid port.

Example 67 can include, or can optionally be combined with the subject matter of Examples 1-66 to optionally include a blower in communication a ballonet cavity of the balloon through the at least one ballast fluid port.

Example 68 can include, or can optionally be combined with the subject matter of Examples 1-67 to optionally include wherein the upper ballonet panel includes different materials from the lower ballonet panel.

Example 69 can include, or can optionally be combined with the subject matter of Examples 1-68 to optionally include a payload coupled with the balloon.

Example 70 can include, or can optionally be combined with the subject matter of Examples 1-69 to optionally include a method for assembling an atmospheric balloon system comprising: positioning an upper ballonet panel over a lower ballonet panel; joining the upper and lower ballonet panels along respective upper and lower perimeter edges; clamping a ballonet lip of the lower ballonet panel in a lower apex fitting, clamping including engaging the ballonet lip in continuous surface to surface contact around the lower apex fitting; and installing the ballonet within a balloon, installing the ballonet includes: feeding the ballonet through a lower apex opening of the balloon, and coupling the lower apex fitting with a balloon lip of the balloon at the lower apex opening.

Example 71 can include, or can optionally be combined with the subject matter of Examples 1-70 to optionally include wherein positioning the upper ballonet panel over the lower ballonet panel includes positioning the upper ballonet panel over the lower ballonet panel, wherein the upper and lower ballonet panels are unitary.

Example 72 can include, or can optionally be combined with the subject matter of Examples 1-71 to optionally include wherein positioning the upper ballonet panel over the lower ballonet panel includes positioning the upper ballonet panel over the lower ballonet panel, wherein the upper and lower ballonet panels include different materials.

Example 73 can include, or can optionally be combined with the subject matter of Examples 1-72 to optionally include wherein joining the upper and lower ballonet panels includes one or more of adhering or heat sealing the upper and lower perimeter edges.

Example 74 can include, or can optionally be combined with the subject matter of Examples 1-73 to optionally include wherein clamping the ballonet lip includes clamping the ballonet lip between first and second clamping rings of the lower apex fitting.

Example 75 can include, or can optionally be combined with the subject matter of Examples 1-74 to optionally include wherein clamping the ballonet lip includes spreading the ballonet lip continuously across the lower apex fitting.

Example 76 can include, or can optionally be combined with the subject matter of Examples 1-75 to optionally include wherein clamping the ballonet lip includes smoothing pleats and wrinkles in the ballonet at the ballonet lip.

Example 77 can include, or can optionally be combined with the subject matter of Examples 1-76 to optionally include coupling a blower with the balloon, the blower in communication with a ballonet cavity of the ballonet through at least one ballast fluid port.

Example 78 can include, or can optionally be combined with the subject mat r of Examples 1-77 to optionally include coupling a payload with the balloon.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An atmospheric balloon system comprising:
    an atmospheric balloon having an upper balloon panel coupled with a lower balloon panel:
        the upper balloon panel includes an upper apex and an upper panel edge, and
        the lower balloon panel includes a lower panel edge, a balloon lip and a lower apex opening at the balloon lip, wherein the upper panel edge is coupled along the lower panel edge;
    a ballonet within the atmospheric balloon, the ballonet is coupled with the lower balloon panel at the lower apex opening, the ballonet includes:
        a lower ballonet panel having a lower perimeter edge and a ballonet orifice extending through the lower ballonet panel at a ballonet lip, the ballonet lip including a flat ring extending around the ballonet orifice,
        an upper ballonet panel having an upper perimeter edge, and
        wherein the upper perimeter edge is coupled along the lower perimeter edge; and
    a lower apex fitting coupling the ballonet lip with the balloon at the balloon lip of the lower apex opening, the lower apex fitting includes first and second clamping rings, and the flat ring of the ballonet lip is coupled in surface to surface contact with the first and second clamping rings.

2. The atmospheric balloon system of claim 1, wherein the ballonet lip is coupled along the lower apex fitting with continuous surface to surface contact between the ballonet lip and the lower apex fitting.

3. The atmospheric balloon system of claim 1, wherein the upper and lower ballonet panels are coupled along the respective upper and lower perimeter edges at an equator of the ballonet.

4. The atmospheric balloon system of claim 1, wherein the lower apex fitting includes at least one ballast fluid port.

5. The atmospheric balloon system of claim 4 comprising a blower in communication a ballonet cavity of the balloon through the at least one ballast fluid port.

6. The atmospheric balloon system of claim 1, wherein the upper ballonet panel includes different materials from the lower ballonet panel.

7. The atmospheric balloon system of claim 1 comprising a payload coupled with the balloon.

8. The atmospheric balloon system of claim 1, wherein the upper and lower panel edges of the upper and lower balloon panels are coupled at an equator of the balloon.

9. The atmospheric balloon system of claim 1, wherein the upper and lower balloon panels and a ballonet exterior form a lift gas chamber, and a ballonet interior forms a ballast chamber.

10. A balloon having a balloon membrane extending between an upper apex and a lower apex opening, the lower apex opening extending through the balloon membrane at a balloon lip;
    a ballonet within the balloon, the ballonet is coupled with the balloon membrane at the lower apex opening, the ballonet includes:
        a lower ballonet panel having a lower perimeter edge and a ballonet orifice extending through the lower ballonet panel at a ballonet lip, the ballonet lip includes a flat ring extending around the ballonet orifice,
        an upper ballonet panel having an upper perimeter edge,
        wherein the upper and lower ballonet panels are coupled along the respective upper and lower perimeter edges; and
    a lower apex fitting coupling the ballonet lip with the balloon at the balloon lip of the lower apex opening, the lower apex fitting includes first and second clamping rings, and the flat ring of the ballonet lip is coupled in surface to surface contact with the first and second clamping rings.

11. The atmospheric balloon system of claim 10, wherein the ballonet lip is coupled along the lower apex fitting with continuous surface to surface contact between the ballonet lip and the lower apex fitting.

12. The atmospheric balloon system of claim 10, wherein the upper and lower ballonet panels are coupled along the respective upper and lower perimeter edges at an equator of the ballonet.

13. The atmospheric balloon system of claim 10, wherein the upper and lower ballonet panels are coupled with an adhesive along the respective upper and lower perimeter edges.

14. The atmospheric balloon system of claim 10, wherein the upper and lower ballonet panels are coupled with a heat seal along the respective upper and lower perimeter edges.

15. The atmospheric balloon system of claim 10, wherein the lower apex fitting includes at least one ballast fluid port.

16. The atmospheric balloon system of claim 15 comprising a blower in communication a ballonet cavity of the balloon through the at least one ballast fluid port.

17. The atmospheric balloon system of claim 10, wherein the upper ballonet panel includes different materials from the lower ballonet panel.

18. The atmospheric balloon system of claim 10 comprising a payload coupled with the balloon.

19. A method for assembling an atmospheric balloon system comprising:
    positioning an upper ballonet panel over a lower ballonet panel;
    joining the upper and lower ballonet panels along respective upper and lower perimeter edges;
    clamping a ballonet lip of the lower ballonet panel in a lower apex fitting, clamping including engaging a flat ring of the ballonet lip in continuous surface to surface contact around the lower apex fitting with first and second clamping rings of the lower apex fitting; and installing the ballonet within a balloon, installing the ballonet includes:
  feeding the ballonet through a lower apex opening of the balloon, and
  coupling the lower apex fitting with a balloon lip of the balloon at the lower apex opening.

20. The method of claim 19, wherein positioning the upper hallow panel over the lower ballonet panel includes positioning the upper ballonet panel over the lower ballonet panel, wherein the upper and lower ballonet panels are unitary.

21. The method of claim 19, wherein positioning the upper ballonet panel over the lower ballonet panel includes positioning the upper ballonet panel over the lower ballonet panel, wherein the upper and lower ballonet panels include different materials.

22. The method of claim 19, wherein joining the upper and lower ballonet panels includes one or more of adhering or heat sealing the upper and lower perimeter edges.

23. The method of claim 19, wherein clamping the ballonet lip includes spreading the ballonet lip continuously across the lower apex fitting.

24. The method of claim 19, wherein clamping the ballonet lip includes smoothing pleats and wrinkles in the ballonet at the ballonet lip.

25. The method of claim 19 comprising coupling a blower with the balloon, the blower in communication with a ballonet cavity of the ballonet through at least one ballast fluid port.

26. The method of claim 19 comprising coupling a payload with the balloon.

* * * * *